(12) United States Patent
Steenblock et al.

(10) Patent No.: US 12,084,230 B2
(45) Date of Patent: Sep. 10, 2024

(54) MULTI-FILM THERMOPLASTIC STRUCTURES AND BAGS HAVING VISUALLY-DISTINCT CONTACT AREAS AND METHODS OF MAKING THE SAME

(71) Applicant: THE GLAD PRODUCTS COMPANY, Oakland, CA (US)

(72) Inventors: Sarah Steenblock, Cincinnati, OH (US); Matthew W. Waldron, West Chester, OH (US); Shaun T. Broering, Fort Thomas, KY (US); Lehai Minh Pham Vu, Cincinnati, OH (US)

(73) Assignee: The Glad Products Company, Oakland, CA (US)

( * ) Notice: Subject to any disclaimer, the term of this patent is extended or adjusted under 35 U.S.C. 154(b) by 261 days.

(21) Appl. No.: 17/441,118

(22) PCT Filed: Mar. 23, 2020

(86) PCT No.: PCT/US2020/024143
§ 371 (c)(1),
(2) Date: Sep. 20, 2021

(87) PCT Pub. No.: WO2020/198107
PCT Pub. Date: Oct. 1, 2020

(65) Prior Publication Data
US 2022/0161979 A1    May 26, 2022

Related U.S. Application Data

(60) Provisional application No. 62/825,520, filed on Mar. 28, 2019.

(51) Int. Cl.
*B65D 33/28* (2006.01)
*B31B 70/14* (2017.01)
(Continued)

(52) U.S. Cl.
CPC ............ *B65D 33/28* (2013.01); *B31B 70/649* (2017.08); *B32B 7/05* (2019.01); *B32B 27/08* (2013.01);
(Continued)

(58) Field of Classification Search
CPC ...... B65D 33/28; B65D 33/06; B65D 65/406; B31B 70/649; B32B 27/08; B32B 27/20;
(Continued)

(56) References Cited

U.S. PATENT DOCUMENTS

| 3,029,853 A | 4/1962 | Piazze |
| 3,114,497 A | 12/1963 | Kugler |

(Continued)

FOREIGN PATENT DOCUMENTS

| CN | 103648750 A | 3/2014 |
| CN | 204222116 U | 3/2015 |

(Continued)

OTHER PUBLICATIONS

Application No. PCT/US2020/024143 International Search Report dated Jul. 15, 2020.

(Continued)

*Primary Examiner* — Derek J Battisti
(74) *Attorney, Agent, or Firm* — Keller Preece PLLC

(57) ABSTRACT

One or more implementations of a multi-film thermoplastic structure include a first film having a first appearance in contact with a second film having a second appearance at one or more visually-distinct contact areas. Wherein the one or more visually-distinct contact areas, cause the first film to take on the second appearance of the second film. The visually-distinct contact areas being of a uniform gauge and configured to separate before either of the first film or the second film fails when subjected to peel forces.

19 Claims, 18 Drawing Sheets

(51) Int. Cl.

| | | |
|---|---|---|
| B31B 70/64 | (2017.01) | |
| B31B 70/81 | (2017.01) | |
| B31B 155/00 | (2017.01) | |
| B31B 170/20 | (2017.01) | |
| B32B 7/05 | (2019.01) | |
| B32B 27/08 | (2006.01) | |
| B32B 27/20 | (2006.01) | |
| B32B 37/00 | (2006.01) | |
| B32B 37/10 | (2006.01) | |
| B32B 38/06 | (2006.01) | |
| B65D 27/00 | (2006.01) | |
| B65D 27/24 | (2006.01) | |
| B65D 30/08 | (2006.01) | |
| B65D 65/40 | (2006.01) | |
| B65F 1/00 | (2006.01) | |

(52) U.S. Cl.

CPC .......... *B32B 27/20* (2013.01); *B32B 37/0076* (2013.01); *B32B 37/10* (2013.01); *B32B 38/06* (2013.01); *B65D 27/005* (2013.01); *B65D 27/24* (2013.01); *B65D 31/02* (2013.01); *B65D 65/406* (2013.01); *B65F 1/002* (2013.01); *B31B 70/146* (2017.08); *B31B 70/8134* (2017.08); *B31B 2155/00* (2017.08); *B31B 2170/20* (2017.08); *B32B 2250/02* (2013.01); *B32B 2250/03* (2013.01); *B32B 2250/24* (2013.01); *B32B 2307/31* (2013.01); *B32B 2307/4026* (2013.01); *B32B 2307/54* (2013.01); *B32B 2307/748* (2013.01); *B32B 2398/20* (2013.01); *B32B 2439/46* (2013.01)

(58) Field of Classification Search

CPC ....... B32B 27/005; B32B 27/24; B32B 37/10; B32B 37/0076; B32B 38/06

See application file for complete search history.

(56) References Cited

U.S. PATENT DOCUMENTS

| | | | |
|---|---|---|---|
| 3,512,456 A | | 5/1970 | Meyer |
| 3,543,999 A | | 12/1970 | Kugler |
| 3,738,568 A | | 6/1973 | Ruda |
| 3,772,968 A | | 11/1973 | Ruda |
| 4,493,683 A | | 1/1985 | Jostler |
| 4,558,463 A | | 12/1985 | Boyd |
| 4,878,764 A | | 11/1989 | Meyer |
| 4,883,675 A | | 11/1989 | Wemz |
| 5,554,093 A | | 9/1996 | Porchia et al. |
| 5,716,137 A | | 2/1998 | Meyer |
| 5,928,972 A | | 7/1999 | Mashiko et al. |
| 6,561,696 B1 | | 5/2003 | Rusnak et al. |
| 7,938,635 B2 | * | 5/2011 | Heilman .................. A61Q 5/00 425/102 |
| 8,876,382 B2 | * | 11/2014 | Wilcoxen ............. B65D 33/004 383/119 |
| 9,393,757 B2 | | 7/2016 | Borchardt et al. |
| 9,604,429 B2 | | 3/2017 | Borchardt et al. |
| 9,745,126 B1 | | 8/2017 | Cobler |
| 10,549,467 B2 | | 2/2020 | Borchardt et al. |
| 10,934,058 B2 | | 3/2021 | Cobler |
| 11,345,118 B2 | | 5/2022 | Wilcoxen et al. |
| 2004/0137200 A1 | | 7/2004 | Chhabra et al. |
| 2005/0123219 A1 | | 6/2005 | Schneider |
| 2007/0036472 A1 | | 2/2007 | Persenda |
| 2007/0257402 A1 | | 11/2007 | Rasmussen |
| 2009/0094943 A1 | | 4/2009 | Heilman et al. |
| 2010/0111452 A1 | | 5/2010 | Ross |
| 2010/0266222 A1 | | 10/2010 | Rusnak et al. |
| 2011/0052105 A1 | | 3/2011 | Wilcoxen et al. |
| 2012/0045153 A1 | | 2/2012 | Schmal et al. |
| 2012/0134606 A1 | * | 5/2012 | Borchardt ............. B65D 33/28 156/196 |
| 2012/0269465 A1 | | 10/2012 | Dorsey et al. |
| 2015/0071574 A1 | * | 3/2015 | Fraser ................. B29C 66/8511 383/109 |
| 2015/0104121 A1 | | 4/2015 | Broering et al. |
| 2015/0191599 A1 | | 7/2015 | Cobler |
| 2017/0305104 A1 | * | 10/2017 | Wilcoxen ................. B32B 3/30 |
| 2018/0282025 A1 | | 10/2018 | Odenthal |
| 2022/0144516 A1 | | 5/2022 | Waldron et al. |
| 2022/0219864 A1 | | 7/2022 | Steenblock et al. |

FOREIGN PATENT DOCUMENTS

| | | |
|---|---|---|
| CN | 104918767 A | 9/2015 |
| CN | 207312156 U | 5/2018 |
| DE | 8634032 U1 | 3/1987 |
| DE | 4133095 | 10/1992 |
| DE | 202008013591 U1 | 2/2010 |
| DE | 102016116639 A1 | 3/2017 |
| EP | 266670 B1 | 3/1992 |
| EP | 953511 B1 | 3/2003 |
| EP | 1364892 B1 | 12/2005 |
| ES | 1061986 U | 5/2006 |
| FR | 2858807 A1 | 10/2005 |
| GB | 2009098 B | 2/1982 |
| JP | 2002179089 A | 6/2002 |
| JP | 4140337 B2 | 6/2008 |
| WO | 88/04635 | 6/1988 |
| WO | 2001/51372 A1 | 7/2001 |
| WO | 2005/016791 A1 | 2/2005 |
| WO | 2006/097104 A2 | 9/2006 |
| WO | 2016/040765 A1 | 3/2016 |

OTHER PUBLICATIONS

Application No. PCT/US2020/024143 Written Opinion of the International Searching Authority dated Jul. 15, 2020.
Office Action as received in CN application 202080025253.8 dated Oct. 12, 2023.
U.S. Appl. No. 17/167,390, Jul. 26, 2022, Office Action.
U.S. Appl. No. 17/167,390, Jan. 13, 2023, Office Action.
U.S. Appl. No. 17/167,390, May 3, 2023, Office Action.
U.S. Appl. No. 17/167,390, Sep. 6, 2023, Office Action.
U.S. Appl. No. 17/585,211, May 19, 2023, Office Action.
U.S. Appl. No. 17/585,211, Jul. 28, 2023, Notice of Allowance.
U.S. Appl. No. 17/167,390, Dec. 20, 2023, Notice of Allowance.
U.S. Appl. No. 18/330,138, Jun. 20, 2024, Office Action.

* cited by examiner

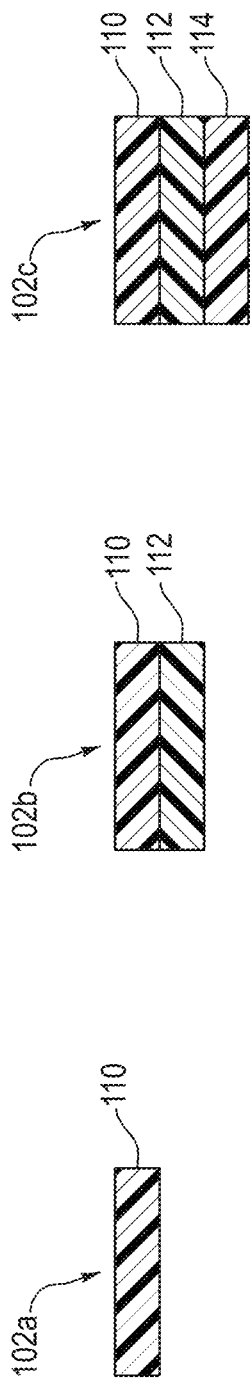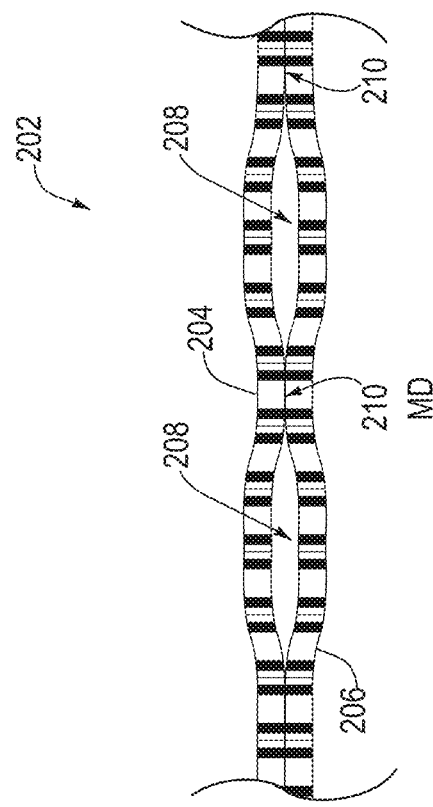

MULTI-FILM THERMOPLASTIC STRUCTURES AND BAGS HAVING VISUALLY-DISTINCT CONTACT AREAS AND METHODS OF MAKING THE SAME

CROSS-REFERENCE

This application claims the benefit of and priority to U.S. Provisional Application Ser. No. 62/825,520, filed on Mar. 28, 2019. The disclosure is herein incorporated by reference in its entirety.

BACKGROUND

1. Technical Field

The present application relates generally to thermoplastic structures and bags formed therefrom. More particularly, the present application relates to thermoplastic structures and bags including multiple films and unique aesthetics.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, some attempt to control manufacturing costs by decreasing the amount of thermoplastic material in a product. One way manufacturers may attempt to reduce production costs is to stretch the thermoplastic film, thereby increasing its surface area and reducing the amount of thermoplastic film needed to produce a product of a given size.

While stretched, thinner gauge materials can represent cost savings to the manufacturer, the use of thinner gauge films can result in lower durability. Although some recent technology may, in some cases at least, result in relatively thinner gauge films that may be as strong as their thicker counterparts, customers naturally sense from prior experience that thinner gauge materials are lower in quality and durability.

For example, some cues to a customer of lower quality and durability of a film are how thick or thin the film feels and how thin or weak the film "looks." Customers tend to view thin looking or feeling films as having relatively low strength. Thus, even though some mechanisms can improve some aspects of film strength while using a thinner gauge, the look and feel of such films tend to cause customers to believe the film is nevertheless low quality. For example, thinner thermoplastic films are typically more transparent or translucent. Such consumers may feel that they are receiving less value for their money when purchasing products with thinner films; and thus, may be dissuaded to purchase thinner thermoplastic films. As such, manufacturers may be dissuaded to stretch a film or use thinner films despite the potential material savings.

Accordingly, there are various considerations to be made with regard to utilizing various techniques in connection with thermoplastic films to create products that are strong, visually appealing, and cost effective.

BRIEF SUMMARY

One or more implementations of the present disclosure solve one or more problems in the art with multi-film thermoplastic structures including one or more visually-distinct contact areas between adjacent films. The visually-distinct contact areas comprise areas in which at least first and second thermoplastic films of the multi-film thermoplastic structure are in intimate contact. Furthermore, when viewing the first thermoplastic film, the visually-distinct contact areas differ in appearance (e.g., a different color) than areas of the first thermoplastic film not in intimate contact with the second thermoplastic film. The visually-distinct contact areas provide a visual cue to the consumer about the strength and quality of the multi-film thermoplastic structure. Furthermore, the visually-distinct contact areas can provide a unique and pleasing visual effect.

For example, an implementation of a multi-film thermoplastic structure comprises a first thermoplastic film having a first appearance and a second thermoplastic film having a second appearance created by a pigment. The first appearance differs from the second appearance. The a multi-film thermoplastic structure also includes one or more separated areas where the first thermoplastic film and the second thermoplastic film are unbonded and optionally separated. The a multi-film thermoplastic structure further includes at least one visually-distinct contact area between the first thermoplastic film to the second thermoplastic film. The at least one visually-distinct contact area, when viewed from the first thermoplastic film side of the multi-film thermoplastic structure, has the second appearance. Also, the at least one visually-distinct contact area is configured to separate before either of the first thermoplastic film or the second thermoplastic film fails when subjected to peel forces. Furthermore, portions of the first and second thermoplastic films in the at least one visually-distinct contact area are flat and un-deformed.

Additionally, an implementation of a multi-layer thermoplastic bag includes a first thermoplastic bag comprising first and second opposing sidewalls joined together along a first side edge, an opposite second side edge, and a closed bottom edge. The first thermoplastic bag is pigmented with a first color. The multi-layer thermoplastic bag additionally includes a second thermoplastic bag positioned within the first thermoplastic bag. The second thermoplastic bag comprises third and fourth opposing sidewalls joined together along a first side edge, an opposite second side edge, and a closed bottom edge. The second thermoplastic bag is pigmented with a second color. The multi-layer thermoplastic bag also includes at least one visually-distinct contact area between the first thermoplastic bag to the second thermoplastic bag. The at least one visually-distinct contact area, when viewed from the first thermoplastic film side of the multi-film thermoplastic structure, has the second color. Furthermore, the at least one visually-distinct contact area is configured to separate before either of the first thermoplastic bag or the second thermoplastic bag fails when subjected to peel forces. Also, the portions of the first and second thermoplastic bags in the at least one visually-distinct contact area are flat and un-deformed.

In addition to the foregoing, a method for making a multi-film thermoplastic bag involves passing a first thermoplastic film having a first appearance and a second thermoplastic film having a second appearance differing from the first appearance between a set of contact rollers including at least one heated roller. Passing the first thermoplastic film and the second thermoplastic film between the set of contact rollers creates one or more visually-distinct contact areas between a flat portion of the first thermoplastic film to a flat portion of the second thermoplastic film. The one or more visually-distinct contact areas create one or more areas in the flat portion of the first thermoplastic film having the second appearance. The one or more visually-distinct contact areas being configured to separate before the flat portion of the first thermoplastic film or the flat portion of the second thermoplastic film fails when subjected to peel forces.

Additional features and advantages of will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific implementations thereof which are illustrated in the appended drawings. It should be noted that the figures are not drawn to scale, and that elements of similar structure or function are generally represented by like reference numerals for illustrative purposes throughout the figures. Understanding that these drawings depict only typical implementations of the present disclosure and are not therefore to be considered to be limiting of its scope, the present disclosure will be described and explained with additional specificity and detail through the use of the accompanying drawings in which:

FIG. 1A-1C show partial side cross-sectional views of films having varying numbers of layers according to one or more implementations of the present disclosure;

FIG. 2 shows a partial side cross-sectional view of a multi-film thermoplastic structure having visually-distinct contact areas between first and second thermoplastic film according to one or more implementations of the present disclosure;

DETAILED DESCRIPTION

Figure 3A:
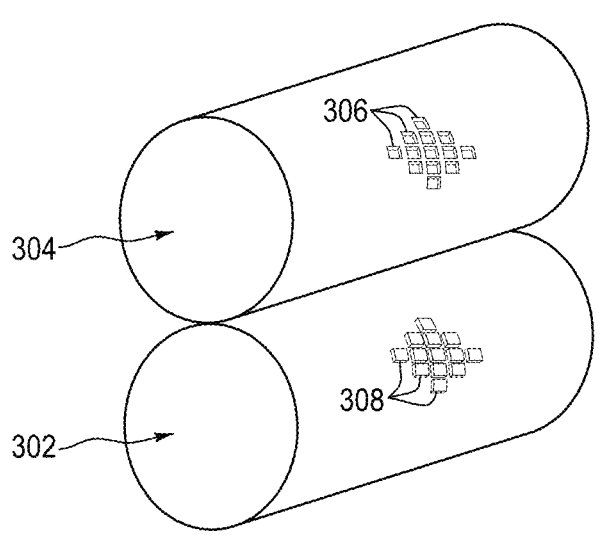
FIGS. 3A-3B show views of a set of contact rollers for forming visually-distinct contact areas according to one or more implementations of the present disclosure.

One or more implementations of the present disclosure include apparatus and methods for creating multi-film thermoplastic structures and multi-film thermoplastic bags with visually-distinct contact areas. In particular, one or more implementations include a multi-film thermoplastic structure and/or bag including areas of visually-distinct contact areas, where the visually-distinct contact areas create visual contrast in at least one portion of the multi-film thermoplastic structure or bag.

In particular, one or more implementations include a multi-film thermoplastic structure with a first thermoplastic film that is a first color and an adjacent second thermoplastic film that is a second color. The contact areas comprise portions of the first thermoplastic film that are in intimate contact with portions of the second thermoplastic film and vice versa. Bringing the first and second thermoplastic films into direct contact can cause an appearance change to the areas or regions of first thermoplastic film. In particular, in one or more implementations, when viewed from the first thermoplastic film side of the multi-film thermoplastic structure, the visually-distinct contact areas comprise a different color than the portions of the first thermoplastic film not in intimate contact with the second thermoplastic film (e.g., separated by a gap or space).

In one or more implementations, the methods described herein organize the visually-distinct contact areas between the films of a multi-film thermoplastic structure into a pattern. For example, the pattern can be continuous or discrete, and can include varying densities of pattern elements. Additionally, the multi-film thermoplastic structure may include the pattern of visually-distinct contact areas over any percentage of the area of the multi-film thermoplastic structure.

Moreover, when films of a multi-film thermoplastic structure or bag have different appearances, due to the inclusion of a pigment or other coloring agent, the visually-distinct contact areas cause the appearance of areas of visual contrast in adjacent films. For example, in a two-film thermoplastic structure where the first thermoplastic film is a light color and the second thermoplastic film is a dark color, intimate contact between the two films cause a whetting effect in an area of the first thermoplastic film. For instance, the intimate contact removes air from between portions of the two films such that the color of the second thermoplastic film shows through the first thermoplastic film. Thus, in this example the contact areas cause a dark area to appear in the lighter first thermoplastic film. Thus, the visually-distinct contact areas can create intimate contact between a portion of a first film and a portion of a second film causing the area of intimate contact to take on the visual characteristics of one of the films. Alternatively, the area of the intimate contact can take on a visual appearance that is a blending of the first and second films, or an appearance that is different from both the first and second films.

One will appreciate in light of the disclosure here that portions of the films of a multi-film thermoplastic structure can be brought into intimate contact with each other using various techniques. In particular, one or more implementations involve utilizing heat and pressure on the films of the multi-film thermoplastic structure to bring the films together and create the visually-distinct contact areas.

Furthermore, one or more implementations involve controlling the amount of heat and pressure to tailor the properties of the films forming the visually-distinct contact areas. For example, in one or more implementations enough heat and pressure are applied so as to bring the films into intimate contact but not so much as to degrade the strength or otherwise weakening the films. For example, in one or more implementations a strength of the films in the visually-distinct contact areas is not substantially weakened. More particularly, in one or more implementations a transverse-direction tensile strength of the films with visually-distinct contact areas is not significantly lower than the areas of the films not including the visually-distinct contact areas. Still further, in one or more implementations, an impact strength (e.g., as measured by a dart drop test) of the films with visually-distinct contact areas is not significantly lower than the areas of the films not including the visually-distinct contact areas.

Additionally, one or more implementations involve controlling the amount of heat and pressure to tailor the properties of the films forming the visually-distinct contact areas such that the films are in intimate contact but unbonded or lightly bonded. For example, one or more implementations provide for forming visually-distinct contact areas between adjacent films of a multi-film thermoplastic structure that are relatively light such that forces acting on the multi-film structure are first absorbed by breaking the bond(s) of the visually-distinct contact areas rather than, or prior to, tearing or otherwise causing the failure of any of the films of the multi-film structure when subjected to peel forces within a given range. Such implementations can provide an overall thinner film employing a reduced amount of raw material that nonetheless has maintained or increased strength parameters. Alternatively, such implementations can use a given amount of raw material and provide a film with increased strength parameters. For example, films including visually-distinct contact areas can have an increased resistance to tear propagation. In particular, the a tear propagating across the film can be stopped or otherwise prohibited when running into a visually-distinct contact area.

In particular, the visually-distinct contact areas between adjacent layers of multi-film structures in accordance with one or more implementations can act to first absorb forces via breaking prior to allowing those same forces to cause failure of the individual films of the multi-film structure when subjected to peel forces. Such action can provide increased strength to the multi-film thermoplastic structure. In one or more implementations, the visually-distinct contact areas include a bond strength that is less than a weakest tear resistance of each of the individual films so as to cause the bonds of the visually-distinct contact areas to fail prior to failure of the films when subjected to peel forces within a given range. Indeed, one or more implementations include visually-distinct contact areas that release prior to any localized tearing of the films of the multi-film thermoplastic structure.

Thus, in one or more implementations, the visually-distinct contact areas of a multi-film thermoplastic structure can fail before either of the individual layers undergoes molecular-level deformation. For example, an applied strain can pull the visually-distinct contact areas apart prior to any molecular-level deformation (stretching, tearing, puncturing, etc.) of the individual film layers. In other words, the visually-distinct contact areas can provide less resistive force to an applied strain than molecular-level deformation of individual films of the multi-film structure. Such a configuration of visually-distinct contact areas can provide increased strength properties to the multi-film thermoplastic structure as compared to a monolayer film of equal thickness or a multi-film structure in which the plurality of layers are tightly bonded together (e.g., coextruded).

As used herein, the terms "lamination," "laminate," and "laminated film," refer to the process and resulting product made by bonding together two or more layers of film or other material. The term "bonding," when used in reference to bonding of multiple layers of a multi-film structure, may be used interchangeably with "lamination" of the layers. According to one or more implementations, adjacent films of a multi-film structure are laminated or bonded to one another.

The term laminate is also inclusive of coextruded multi-layer films comprising one or more tie layers. As a verb, "laminate" means to affix or adhere (by means of, for example, adhesive bonding, pressure bonding, ultrasonic bonding, corona lamination, heat bonding, and the like) two or more separately made film articles to one another so as to form a multi-film structure. As a noun, "laminate" means a product produced by the affixing or adhering just described.

In one or more implementations, the visually-distinct contact areas between films of a multi-film structure may be continuous. As used herein, a "continuous" of visually-distinct contact area refers to a continuous visually-distinct contact area in the machine direction, in the transverse direction, or in an angled direction.

In one or more implementations, the visually-distinct contact areas between films of a multi-film structure may be in a discrete or non-continuous pattern (i.e., discontinuous or partial discontinuous). As used herein, a "discrete pattern" of visually-distinct contact areas refers to a non-repeating pattern of pattern elements in the machine direction, in the transverse direction, or in an angled direction.

In one or more implementations, the visually-distinct contact areas between films of a multi-film structure may be in a partially discontinuous pattern. As used herein, a "partially discontinuous" pattern of visually-distinct contact areas refers to pattern elements that are substantially continuous in the machine direction or in the transverse direction, but not continuous in the other of the machine direction or the transverse direction. Alternately, a partially discontinuous pattern of visually-distinct contact areas refers to pattern elements that are substantially continuous in the width of the article but not continuous in the height of the article, or substantially continuous in the height of the article but not continuous in the width of the article. More particularly, a partially discontinuous pattern of visually-distinct contact areas refers to repeating pattern elements broken up by repeating separated areas in either the machine direction, the transverse direction, or both. Both partially discontinuous and discontinuous patterns are types of non-continuous heated pressure bonding (i.e., bonding that is not complete and continuous between two surfaces).

One or more implementations involve bringing pigmented, lightly pigmented, and/or substantially un-pigmented thermoplastic films into intimate contact. As used herein, the term "substantially un-pigmented" refers to a thermoplastic ply or plies that are substantially free of a significant amount of pigment such that the ply is substantially transparent or translucent. For example, a "substantially un-pigmented" film can have a pigment concentration (i.e., percent of total composition of the film) that is between 0% by weight and 2% by weight. In some embodiments, a "substantially un-pigmented" film can have a pigment concentration between about 0% by weight and about 1% by weight. In further embodiments, a "substantially un-pigmented" film can have a pigment concentration between about 0% by weight and about 0.75% by weight. A substantially un-pigmented film can have a transparent or translucent appearance.

As used herein, the term "lightly pigmented" refers to a thermoplastic ply or plies that are pigmented such that, when placed into intimate contact with a pigmented film, an unexpected appearance is produced. For example, the unexpected appearance can be a "whetting" of a color of the pigmented film through the lightly pigmented film. Alternately, the unexpected appearance may be an effect that differs from an appearance (e.g., colors) of the individual films. If a film has too much pigment, when placed into intimate contact with another pigmented film, an unexpected appearance will not be produced. The amount of pigment in a lightly pigmented film that will produce the unexpected appearance can be dictated by the thickness of the film.

A pigmented film can comprise a lightly pigmented film or a film with a greater percentage of pigment than a lightly pigmented film. As mentioned above, in one or more embodiments, a first thermoplastic film is substantially un-pigmented or lightly pigmented and a second thermoplastic film is pigmented. Thus, in one or more embodiments, the second thermoplastic layer has a greater percentage of pigment than the first thermoplastic layer. Alternatively, the first and second thermoplastic layers have the same percentage of pigment but the first thermoplastic layer comprises a lighter pigment than the second thermoplastic layer.

As used herein, the term "pigment or pigments" are solids of an organic and inorganic nature which are defined as such when they are used within a system and incorporated into the thermoplastic film, absorbing part of the light and reflecting the complementary part thereof which forms the color of the thermoplastic ply. Representative, but not limiting, examples of suitable pigments include inorganic colored pigments such as such as iron oxide, in all their shades of yellow, brown, red and black; and in all their physical forms and particle-size categories, chromium oxide pigments, also co-precipitated with nickel and nickel titanates, blue and green pigments derived from copper phthalocyanine, also chlorinated and brominated in the various alpha, beta and epsilon crystalline forms, yellow pigments derived from lead sulphochromate, yellow pigments derived from lead bismuth vanadate, orange pigments derived from lead sulphochromate molybdate lead oxide, cadmium sulfide, cadmium selenide, lead chromate, zinc chromate, nickel titanate, and the like. For the purposes of the present invention, the term "organic pigment" comprises also black pigments resulting from organic combustion (so-called "carbon black"). Organic colored pigments include yellow pigments of an organic nature based on arylamides, orange pigments of an organic nature based on naphthol, orange pigments of an organic nature based on diketo-pyrrolo-pyrole, red pigments based on manganese salts of azo dyes, red pigments based on manganese salts of beta-oxynaphthoic acid, red organic quinacridone pigments, and red organic anthraquinone pigments. Organic colored pigments include azo and diazo pigments, phthalocyanines, quinacridone pigments, perylene pigments, isoindolinone, anthraquinones, thioindigo, solvent dyes and the like.

Pigments can be light reflecting (e.g., white pigments) or light absorbing (e.g., black pigments). Examples of pigments suitable for one or more implementations include titanium dioxide, Antimony Oxide, Zinc Oxide, White Lead, Lithopone, Clay, Magnesium Silicate, Barytes (BaSO4), and Calcium Carbonate (CaCO3).

Film Materials

As an initial matter, the thermoplastic material of the films of one or more implementations of the present disclosure may include thermoplastic polyolefins, including polyethylene and copolymers thereof and polypropylene and copolymers thereof. The olefin-based polymers may include ethylene or propylene based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly(ethylene-butylacrylate), polyurethane, poly(ethylene-propylene-diene), ethylene-propylene rubber, nylon, etc.

Some of the examples and description herein below refer to films formed from linear low-density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.930, and a melt index (MI) of from about 0.5 to about 10. For example, some examples herein use an octene comonomer, solution phase LLDPE (MI=1.1; ρ=0.920). Additionally, other examples use a gas phase LLDPE, which is a hexene gas phase LLDPE formulated with slip/AB (MI=1.0; ρ=0.920). Still further examples use a gas phase LLDPE, which is a hexene gas phase LLDPE formulated with slip/AB (MI=1.0; ρ=0.926). One will appreciate that the present disclosure is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present disclosure.

Some implementations of the present disclosure may include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic materials. As used herein, the term "elastic-like" describes the behavior of web materials which when subjected to an applied strain, the web materials extend in the direction of applied strain, and when the applied strain is released the web materials return, to a degree, to their pre-strained condition.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 70.0% met, at least 80.0%, at least 90% met, at least 95.0% met, at least 99.0% met, or even at least 99.9% met.

Additional additives that may be included in one or more implementations include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to: calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

One of ordinary skill in the art will appreciate in view of the present disclosure that manufacturers may form the films or webs to be used with the present disclosure using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by conventional film-making processes (e.g., casting and blowing). Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (mono-axial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Both a blown film and a cast film can be formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a film with layers having different compositions. Such multi-film structure may later be provided with a complex stretch pattern to provide the benefits of the present disclosure.

In a blown film process, the die can be an upright cylinder with a circular opening. Rollers can pull molten thermoplastic material upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more implementations, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more implementations the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more implementations the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present disclosure may not be uniform. Thus, the starting gauge of films of one or more implementations of the present disclosure may vary along the length and/or width of the film.

As described above, a multi-layer thermoplastic structure includes a plurality of thermoplastic films. Each individual film may itself include a single layer or multiple layers. In other words, the individual films of the multi-film structure may each themselves comprise a plurality of layers. Such layers may be significantly more tightly bonded together than the bonding (if any) of the visually-distinct contact areas. Both tight and relatively weak bonding can be accomplished by joining layers by mechanical pressure, joining layers with heat, joining with heat and pressure, joining layers with adhesives, spread coating, extrusion coating, ultrasonic bonding, static bonding, cohesive bonding and combinations thereof. Adjacent sub-layers of an individual film may be coextruded. Co-extrusion results in tight bonding so that the bond strength is greater than the tear resistance of the resulting laminate (i.e., rather than allowing adjacent layers to be peeled apart through breakage of the lamination bonds, the film will tear).

A thermoplastic film can may include a one, two, three, or more layers of thermoplastic material. FIGS. 1A-1C are partial cross-sectional views of films that can be included in a multi-film thermoplastic structure of one or more implementations. In some implementations, the film may include a single layer film 102a, as shown in FIG. 1A, comprising a single layer 110. In other embodiments, the film can comprise a two-layer film 102b as shown in FIG. 1B, including a first layer 110 and a second layer 112. The first and second layers 110, 112 can be coextruded. In such implementations, the first and second layers 110, 112 may optionally include different grades of thermoplastic material and/or include different additives, including polymer additives and/or pigments. In yet other implementations, a film be a tri-layer film 102c, as shown in FIG. 1C, including a first layer 110, a second layer 112, and a third layer 114. In yet other implementations, a film may include more than three layers. The tri-layer film 102c can include an A:B:C configuration in which all three layers vary in one or more of gauge, composition, color, transparency, or other properties. Alternatively, the tri-layer film 102c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the film layers can comprise layer ratios of 20:20:60, 40:40:20, 15:70:15, 33:34:33, 20:60:20, 40:20:40, or other ratios.

In one example, the film 102a can comprise a 0.5 mil, 0.920 density LLDPE, colored film containing 4.8% pigment that appears a first color. In an alternative embodiment, the film 102a can comprise a 0.5 mil, 0.920 density LLDPE, un-pigmented film that appears clear or substantially clear. In still further embodiments, the film 102a can comprise a 0.5 mil, 0.920 density LLDPE, pigmented film that appears a second color.

In at least one implementation, such as shown in FIG. 1C, a multilayered film 102c can include co-extruded layers. For example, the film 102c can include a three-layer B:A:B structure, where the ratio of layers can be 20:60:20. The exterior B layers (i.e., the first layer 110, and the third layer 114) can comprise a mixture of hexene LLDPE of density 0.918, and metallocene LLDPE of density 0.920. The interior A core layer (i.e., the second layer 112) can comprise a mixture of hexene LLDPE of density 0.918, butene LLDPE of density 0.918, reclaimed resin from trash bags. Additionally, the A core layer (i.e., the second layer 112) can include a pigment. For example, the A core layer can include a colorant in an amount between about 0.1 percent and about 6%.

In another example, the film 102c is a coextruded three-layer B:A:B structure where the ratio of layers is 15:70:15. The B:A:B structure can also optionally have a ratio of B:A that is greater than 20:60 or less than 15:70. In one or more implementations, the LLDPE can comprise greater than 50% of the overall thermoplastic material in the film 102c.

In another example, the film 102c is a coextruded three-layer C:A:B structure where the ratio of layers is 20:60:20. The C layer (i.e., the third layer 114) can comprise a LLDPE material with a first colorant (e.g., black). The B layer (i.e., the second layer 112) can also comprise a LLDPE material with a second colorant (e.g., white). The LLDPE material can have a MI of 1.0 and density of 0.920 g/cm3. The A core layer (i.e., the first layer 110) can comprise similar materials to any of the core layer describe above. The A core layer can comprise a black colorant, a white colorant, or can be clear.

In still further embodiments, a film can comprise any number of co-extruded layers. More particularly in one or more embodiments, a film can comprise any number of co-extruded layers so long as the A and B layers do not alternate such that the A layers are on one side and the B layers are on the other side. In still further embodiments, a film can comprise one or more co-extruded layers between the A and B layers. For example, the a film can comprise clear or transparent layers between the A and B layer(s). In still further embodiments, a film can comprise intermittent layers of different colors in addition to the A and B layer(s).

FIG. 2 illustrates one example of a multi-film thermoplastic structure 202 including visually-distinct contact areas 210 between a first thermoplastic film 204 and a second thermoplastic layer 206. Each of the thermoplastic films 204, 206 can comprise any of the thermoplastic films 102a-102c described above or a film with more than three layers. FIG. 2 illustrates that the first thermoplastic film 204 of the multi-film thermoplastic structure 202 is secured to the second thermoplastic film 206 via visually-distinct contact areas 210. In particular, the multi-film thermoplastic structure 202 can include visually-distinct contact areas 210 and separated regions 208. The visually-distinct contact areas 210 remove the air and/or space between the thermoplastic films 204, 206.

As shown by FIG. 2, the visually-distinct contact areas 210 can comprise areas in which the first thermoplastic film 204 is in direct, or intimate, contact with the second thermoplastic film 206. As such, the visually-distinct contact areas 210 can create regions that are visually distinct from the rest of the multi-film thermoplastic structure 202 (at least when viewing the major surface of the first thermoplastic film 204). In other words, because the first thermoplastic film 204 is directly abutted against the second thermoplastic film 206, the visually-distinct contact areas 210 can have the color or appearance of the second thermoplastic film 206 or another color or appearance that differs from the separated portions of the first thermoplastic film 204.

For example, in one or more implementations, the second thermoplastic film 206 can comprise a pigmented film and have a black appearance while the first thermoplastic film 204 is substantially un-pigmented or lightly pigmented and have a clear, transparent, or cloudy appearance. When combined to form a multi-film thermoplastic structure 202 in accordance the principles described herein, the first thermoplastic film 204 as part of the multi-film thermoplastic structure 202 can have a color or appearance that differs from the color of the first thermoplastic film 204. For example, the first thermoplastic film 204 can have a metallic, silvery metallic or light grey color rather than a black appearance or color as would be expected (i.e., due to viewing the second thermoplastic film 206 through a clear or transparent film). The regions or areas of the two films in intimate contact with each other create visually-distinct contact areas that have a color or appearance that differs from the color or appearance of the first thermoplastic film 204. For example, the visually-distinct contact areas 210 can have the color or appearance of the second thermoplastic film 206 (e.g., black).

In one or more alternative implementations, the first thermoplastic film 204 comprises a light colorant while the second thermoplastic film 206 comprises a dark colorant. As used herein, a light colorant is a color with a brightness closer to the brightness of white than the brightness of black. As used herein, a dark colorant is a color with a brightness closer to the brightness of black than the brightness of white. In one or more embodiments, the first thermoplastic film 204 has a concentration of light colorant between about 1% by mass and about 15% by mass. More particularly, in one or more embodiments, the first thermoplastic film 204 has a concentration of light colorant between about 2% by mass and about 12% by mass. In still further embodiments, the first thermoplastic film 204 has a concentration of light colorant between about 5% by mass and about 10% by mass.

Still further, the second thermoplastic film 206 has a concentration of dark colorant between about 1% by mass and about 15% by mass. More particularly, in one or more embodiments, the second thermoplastic film 206 has a concentration of dark colorant between about 2% by mass and about 12% by mass. In still further embodiments, the second thermoplastic film 206 has a concentration of dark colorant between about 5% by mass and about 10% by mass.

The white colored first thermoplastic film 204, when part of the multi-film thermoplastic structure 202 can have a gray appearance. The foregoing described color change may give the appearance of a third color without requiring the actual colorant mixture of the third color to be within the multi-film thermoplastic structure 202. In other words, the structure can be devoid of a gray pigment. For example, it may allow a film having a viewable black layer and a viewable white layer to have (i.e., mimic) a gray appearance (often a consumer preferred color). Furthermore, the foregoing described color change may allow the film to mimic a gray appearance without significantly increasing and/or reducing a transparency (i.e., light transmittance) of the film. In other words, the foregoing described color change may allow the multi-film thermoplastic structure 202 to mimic a gray appearance without detrimentally affecting an appearance of quality of the film.

Thus, the visually-distinct contact areas have a color or appearance that differs from the color or appearance of the first thermoplastic film 204. For example, the visually-distinct contact areas 210 can have the color or appearance of the second thermoplastic film 206 (e.g., black) or another color. One will appreciate in light of the disclosure herein that black and white are used as exemplary colors for ease in explanation. In alternative embodiments, the films can comprise other color combinations such as white and blue, yellow and blue, red and blue, etc.

Irrespective of the specific colors of the first and second thermoplastic films, the visually-distinct contact areas 210 can have a substantial change in appearance compared to the separated areas 208 when viewed from the first thermoplastic film side of the multi-film thermoplastic structure 202. In some embodiments, for example, when using the LAB color space, a represents a measurement of green and magenta values, b represents a measurement of blue and yellow values, and L represents a measurement of lightness (i.e., white and back values). In some embodiments, the change in appearance of the visually-distinct contact areas 210 comprises a color change in which the L value decreases by at least five points. In some embodiments, the change in appearance of the visually-distinct contact areas 210 comprises a color change in which the L value decreases between five and forty points, between five and thirty points, or between five and twenty points.

For example, the change in appearance of the visually-distinct contact areas 210 may include a perceivable change of color from gray to black. In additional embodiments, the change in appearance of the visually-distinct contact areas 210 may include a perceivable change of color from a first relatively lighter color to a second darker color. For example, the change in appearance may include perceivable change of color from a first light gray to a second dark gray.

In other implementations, the change in appearance may include perceivable change of color from a first lighter version of any color to a second darker version of the same color.

As another example, it may allow a film having a viewable blue layer (with a back yellow layer) to have (i.e., mimic) a green appearance. Furthermore, the foregoing described color change may allow the film to mimic a green appearance without significantly increasing and/or reducing a transparency (i.e., light transmittance) of the film. In other words, the foregoing described color change may allow the film to mimic a green appearance without detrimentally affecting an appearance of quality of the film. As a result of the foregoing, the multi-layer film of the present disclosure may provide a multi-layer film having a particular appearance (e.g., a green appearance) while reducing costs. One will appreciate that other color combination in addition to white/black producing grey and yellow/blue producing green are possible and the foregoing are provide by way of example and not limitation.

FIG. 2 further illustrates that the visually-distinct contact areas 210 secure the thermoplastic films 204, 206 of the multi-film thermoplastic structure 202 such that the thickness of the thermoplastic films 204, 206 is substantially unchanged at each of the visually-distinct contact areas 210. In other words, each of the first and second thermoplastic films 204, 206 can have a substantially uniform gauge (e.g., are substantially flat). In other words, the gauge of the first and second thermoplastic films 204, 206 in the separated regions 208 is substantially the same as the gauge of the first and second thermoplastic films 204, 206 in the visually-distinct contact areas 210. This is in contrast to ring rolled, SELF'ed, conventional embossing, or other processes that can bond film layers together, while also deforming portions of the films. As mentioned above, the heat, pressure, and depth of engagement during creation of the visually-distinct contact areas can control to what extent, if any, the thermoplastic films are deformed when forming the visually-distinct contact areas 210. In one or more implementations, the process of forming the visually-distinct contact areas 210 does not deform, or does not substantially deform, the thermoplastic films such that they are flat, or appear flat, despite the presence of visually-distinct contact areas 210. In alternative implementations, the portions of the first and second thermoplastic films comprising the visually-distinct contact areas 210 create an increase or decrease in the gauge or loft of the multi-film thermoplastic structure 202.

In one or more implementations, the creation of the visually-distinct contact areas 210 does not weaken the first and second thermoplastic films 204, 206. For example, in one or more implementations the portions of the first and second thermoplastic films 204, 206 comprising the visually-distinct contact areas 210 is not significantly lower than the portions of the first and second thermoplastic films 204, 206 in the areas of separation 208. In particular, in one or more implementations film in the visually-distinct contact areas 210 have transverse direction tensile strength that is the same as the film in the separated areas 208.

FIGS. 3A-3D illustrate various implementations of contact rollers for forming visually-distinct contact areas. For example, as shown in FIG. 3A, the contact rollers include a punch roll 302 and a cooperating die roll 304. Each of the punch roll 302 and the die roll 304 may be cylindrical and may have longitudinal axes that are parallel to each other. The punch roll 302 and the die roll 304 may define a passage or tooling nip therebetween through which film materials may pass through to form the visually-distinct contact areas.

As shown in FIG. 3A, the punch roll 302 is provided with punch regions 308 and the die roll 304 is provided with corresponding die regions 306 for cooperating with, or receiving, the punch regions 308.

Figure 3B:
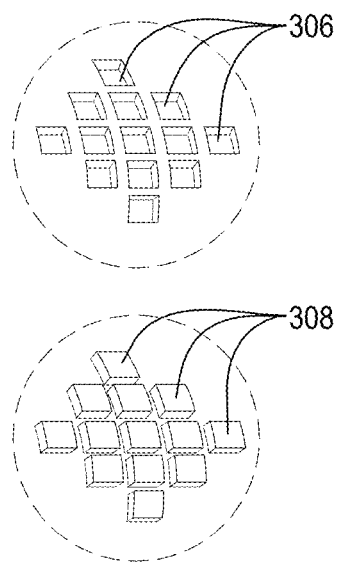

As illustrated in the enlargement shown in FIG. 3B, the punch regions 308 may each have a plurality of punch elements for cooperating with corresponding die elements in the die regions 306. The cooperating engagement of the punch elements with the die elements, with one or more thermoplastic films therebetween, forms visually-distinct contact areas by pressing thermoplastic films together.

Figure 3C:
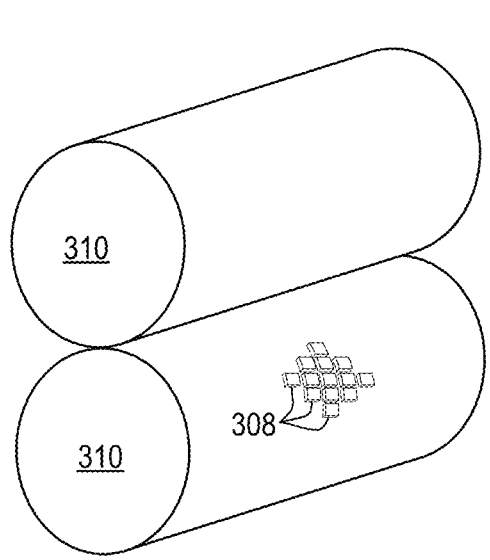
FIG. 3C shows a perspective view of another set of contact rollers for forming visually-distinct contact areas according to one or more implementations of the present disclosure.
Figure 3D:
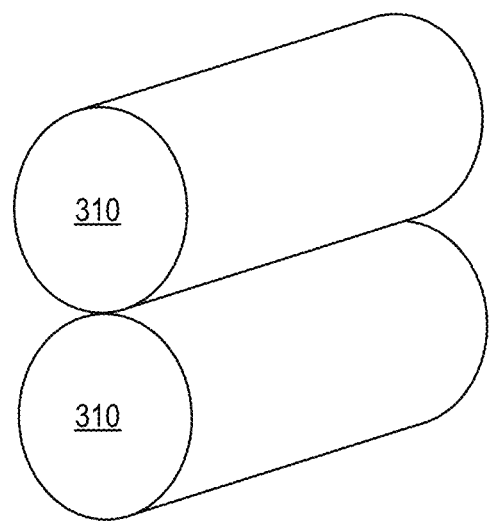
FIG. 3D shows a perspective view of yet another set of contact rollers for forming visually-distinct contact areas according to one or more implementations of the present disclosure.

FIG. 3C illustrates an alternative set of contact rollers comprise a punch roll 302 and a press roll 310. The press roll may comprise a conformable surface for conforming to the punch elements, or other surface configuration of the punch roll 302. In still further embodiments, the press roll can comprise a rubber roll. FIG. 3D illustrates yet another implementation of contact rollers comprising two flat rolls.

In any event, one of the rolls may be formed from a relatively hard material (e.g., steel, aluminum, ebonite or other suitable hard material), and the other may be formed from a softer material (e.g., rubber or other suitable softer material). For example, the punch roll 302 and the cooperating die roll 304 may include a steel-to-rubber interface. In alternative embodiments, both the punch roll 302 and the die roll 304 may be formed from the relatively hard material (e.g., steel). Put another way, the punch roll 302 and the die roll 304 may include a steel-to-steel interface. Regardless of whether the punch roll 302 and the die roll 304 include a steel-to-rubber interface or a steel-to-steel interface, in one or more implementations, one or more of the contact rollers may include an electrically heated roll (e.g., means of heating). For example, in one embodiment, an aluminum punch roll 302 is internally heated by an electric source and a rubber die roll 304 is unheated. Alternatively, in at least one embodiment, at least one of the punch roll 302 and the die roll 304 may be externally heated (e.g., by directing a heat source at one or more outer portions of the roll). In alternative embodiments, the neither of the contact rollers are heated.

The plurality of punch elements may have height of between about 10.0 mils and about 40.0 mils, and the receiving the die elements may have depth of between about 10.0 mils and about 40.0 mils. In at least one implementation, as shown in FIG. 3B, the punch elements and the correlating die elements can include a plurality of evenly spaced squares forming a repeat unit. In alternative implementations, the punch elements and the correlating die elements can include a plurality of evenly spaced chevron patterns. Alternatively, the punch elements and the correlating die elements can include a plurality of random polygon shaped protrusions and a plurality of matching random polygon shaped recesses to form a mosaic of random polygon shaped recesses.

Figure 3E:
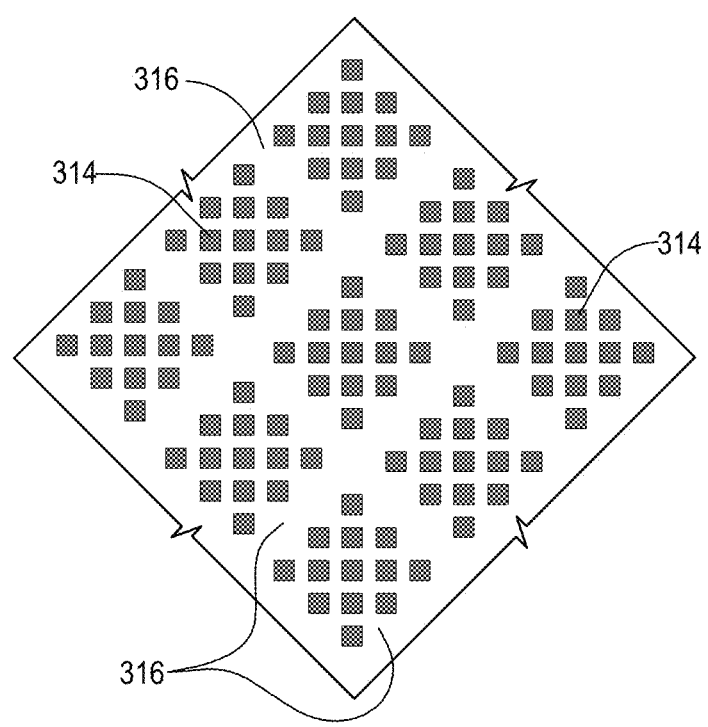
FIG. 3E shows a view of a portion of a multi-film thermoplastic structure having visually-distinct contact areas created by the contract rollers of FIG. 3A or 3C according to one or more implementations of the present disclosure.

Referring to FIG. 3E, a pattern formed by the contact rollers 302, 304 is illustrated in which each of the visually-distinct contact areas 314 in a flat portion of the multi-film thermoplastic structure is formed by a cooperating set of punch and die elements, and the remaining unformed areas define the separated areas 316 of the multi-film thermoplastic structure. As mentioned above, and as discussed further below, the visually-distinct contact areas 314 provide a visual impression with significant contrast to the multi-film thermoplastic structure.

In at least one embodiment, one or both of the contact rollers 302, 304 are heated to a temperature between 125 degrees and 324 degrees (Fahrenheit) in order to create the visually-distinct contact areas 314. Additionally, in at least one embodiment, the contact rollers 302, 304 may create the visually-distinct contact areas 314 by being positioned so as to create a tooling nip (e.g., a passage) where a multi-film thermoplastic structure passing therein experiences pressure within a range of 100-1800 pounds per square inch. Furthermore, the contact rollers 302, 304 may create the visually-distinct contact areas 314 by spinning at speeds of 500-1200 feet per minute. In one or more embodiments, the contact rollers 302, 304 may operate within these ranges of heat, pressure, and speed while processing a two-layer thermoplastic film, a four-layer thermoplastic film, or a multi-film thermoplastic structure with even more layers.

In at least one embodiment, one or both of the contact rollers 302, 304 are pre-heated along the outer perimeter of the contact rollers 302, 304 to a temperature within the range described above. Additionally or alternatively, the multi-film thermoplastic structure may be pre-heated prior to passing through the contact rollers 302, 304.

Figure 4A:
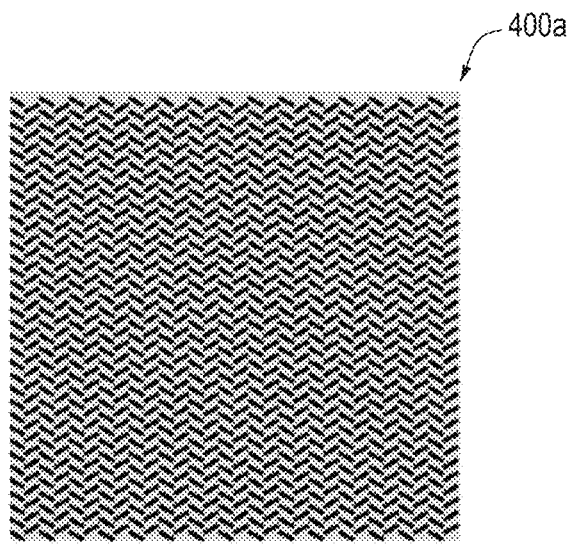
FIGS. 4A-4C illustrate top views of multi-film thermoplastic structures including patterns of visually-distinct contact areas at varying sizes and pattern element densities according to one or more implementations of the present disclosure.
Figure 4B:
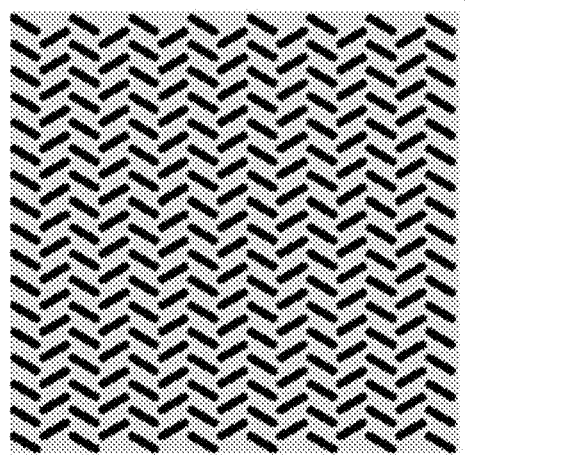
Figure 4C:
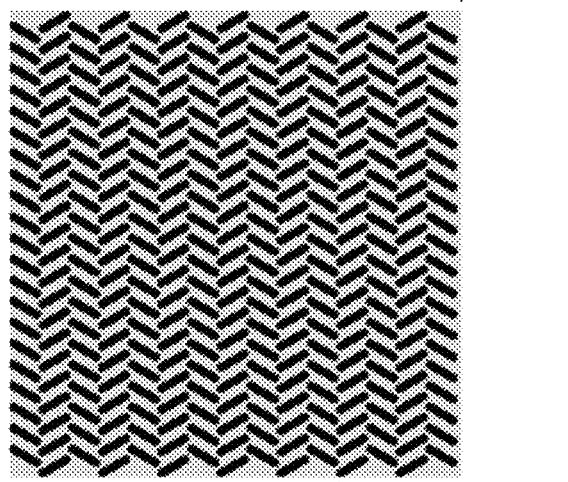

As mentioned above, one or more implementations described herein include patterns of visually-distinct contact areas of a multi-film thermoplastic structure. FIGS. 4A-4C illustrate various patterns of visually-distinct contact areas in a flat portion of a multi-film thermoplastic structures 400a, 400b, and 400c, respectively. For example, as shown in FIG. 4A, the multi-film thermoplastic structure 400a includes a series of visually-distinct contact areas of small scale and close density. As shown in FIG. 4B, the multi-film thermoplastic structure 400b includes a series of visually-distinct contact areas of large scale with medium density. Furthermore, as shown in FIG. 4C, the multi-film thermoplastic structure 400c includes a series of visually-distinct contact areas of large scale with close density.

Regardless of the scale or pattern element density of the patterns of visually-distinct contact areas illustrated in FIGS. 4A-4C, the visually-distinct contact areas form intimate contact between the layers of the multi-film thermoplastic structures 400a, 400b, and 400c. In one or more implementations, the intimate contact of the visually-distinct contact areas cause the color of the bottom layer of the multi-film thermoplastic structure to "wet-through" or appear through the top layer of the multi-film thermoplastic structure. Thus, the visually-distinct contact areas illustrated in FIGS. 4A-4C give a visual impression with significant contrast to the separated areas of the multi-film thermoplastic structures 400a, 440b, and 400c, respectively.

In order to emphasize the pattern of visually-distinct contact areas in one or more embodiments, the visually-distinct contact areas can involve forming wide visually-distinct contact areas. For example, the visually-distinct contact areas can comprise a width of at least ⅓2nd, 1/16th, ⅛th, ¼th of an inch or greater.

Figure 5:
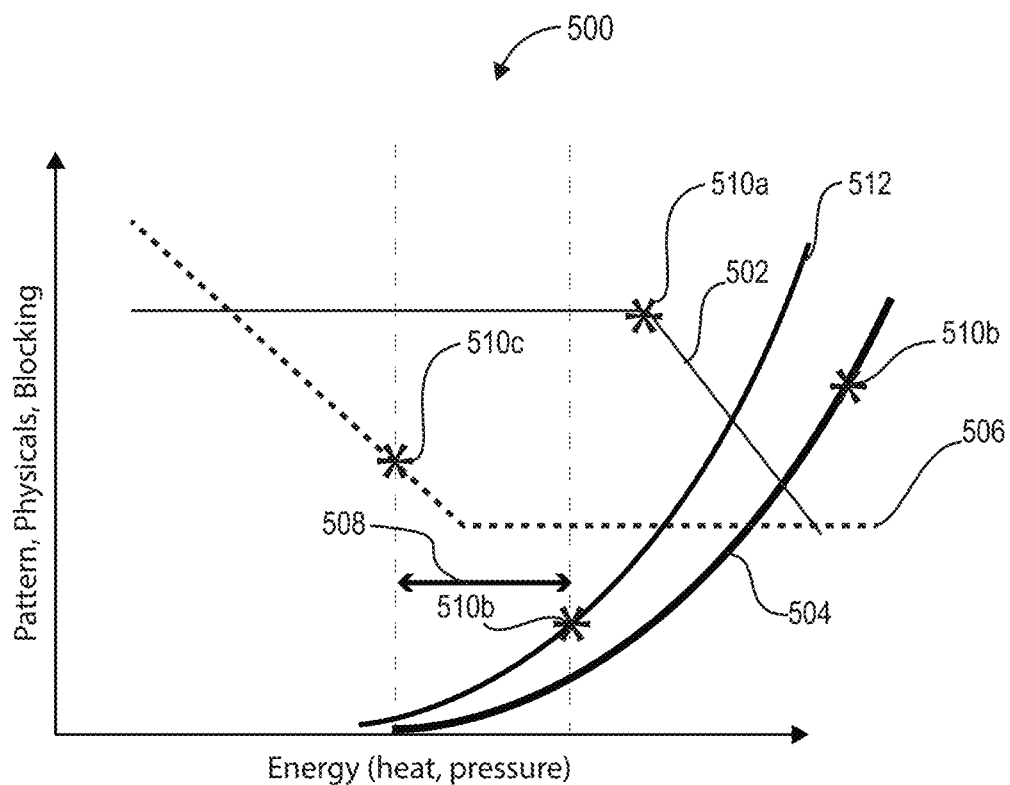
FIG. 5 shows a chart illustrating levels of heat and pressure applied during the visually-distinct contact area creation process according to one or more implementations of the present disclosure.

As mentioned above, in at least one implementation, the visually-distinct contact areas between portions of thermoplastic film layers of a multi-film thermoplastic structure are formed passing through contact rollers in a process that includes applying heat and pressure to the portions of thermoplastic film layers. FIG. 5 includes a chart 500 illustrating an optimal amount of heat and pressure applied during the heat embossing process that results in preferred quality measures (e.g., visual or pattern, physicals, blocking, and holes) of the resulting multi-film thermoplastic structure.

For example, as shown in FIG. 5, as heat and pressure increase, the physical properties of a multi-film thermoplastic structure indicated by the curve 502 remain the same until a drop off point 510a (e.g., yield point). After the drop off point 510a, the continued increase of heat and pressure cause the physical properties of the multi-film thermoplastic structure to deteriorate rapidly. As used herein, the "physical properties," "physical parameters," or "physicals" of a multi-film thermoplastic structure refer to the molecular strength of the multi-film thermoplastic structure. In particular, the physicals indicated by curve 502 can comprise transverse direction tensile strength, transverse or machine direction tear resistance, or puncture resistance (e.g., as measured by a dart drop test).

As further shown in FIG. 5, as heat and pressure increase in the process, the blocking of the multi-film thermoplastic structure indicated by the curve 504 increases in approximately an exponential manner. As used herein, "blocking" refers to the level with which a thermoplastic film sticks to itself. As indicated by the point 510b, there is an amount of heat and pressure beyond which the amount of blocking exhibited by a multi-film thermoplastic structure is undesirable. For example, a high level of blocking can cause the multi-film thermoplastic structure to self-stick in such a way that it is unusable for the processes described herein. In particular, by at least point 510b the films are sealed together in a manner that they cannot be separated without causing the individual layers to fail.

Moreover, as shown in FIG. 5, as heat and pressure increase in the heat embossing process, the aesthetic value (e.g., the visibility as measured by ΔE) of the pattern of heated pressure seals formed by the heat embossing process decreases, as indicated by the curve 506. For example, as indicated by the point 510c, an excess amount of heat and pressure during the heat embossing process causes the aesthetic value of the pattern of visually-distinct contact areas pressed into the multi-film thermoplastic structure to decrease to an undesirable level. This decrease in aesthetic value may result in a pattern of visually-distinct contact areas that is difficult to recognize, unnuanced, or otherwise undesirable.

Additionally, as shown in FIG. 5, increasing heat and pressure can cause a creation of holes (e.g., micro pores or larger holes) within a multi-film thermoplastic structure. As illustrated, it is possible for the process to create holes in the multi-film thermoplastic structure prior to any significant loss of other physicals (e.g., the molecular strength of the multi-film thermoplastic structure). For example, an amount of heat and pressure beyond the point 510d can cause holes to form within one or more layers of the multi-film thermoplastic structure. Holes within the multi-film thermoplastic structure are generally undesirable as they may make the multi-film thermoplastic structure unfit for its intended purpose (e.g., lead to leaks in a trash bag).

Thus, as shown by the arrow 508 in the chart 500, there is a range of heat and pressure that can be applied during the visually-distinct contact area creation process that results in optimized levels for physicals, blocking, pattern (i.e., visual), and holes. In one or more implementations, this range includes heating at least one contact roller to a range of 125-325 degrees Fahrenheit. Furthermore, the range includes pressure in the tooling nip at a range of 100-1800 pounds per square inch. Moreover, in at least one implementation, the range also includes speeds of the contact rollers at a range of 500-1200 feet per minute. In alternative implementations, the preferred range may include heats, pressures, or speeds at other ranges.

When operated within the ranges of heat and pressure indicated by the arrow 508 in the chart 500, the visually-distinct contact areas creation process described herein produces visually-distinct contact areas with optimized qualities. For example, in at least one embodiment, a visually-distinct contact area created by the process operating within the optimal heat and pressure ranges exhibits a pattern where the Delta E of the pattern versus separated areas of the films is 0.3 to 50 points higher and more specifically 1.0 to 10.3 points higher. For example, Delta E can refer to the visibility of the visually-distinct contact area and can include one or more of a change in L luminance value associated with the visually-distinct contact area, a change in a-measure of red/green lightness/darkness associated with the visually-distinct contact area, or a change in a b-measure of blue/yellow lightness/darkness associated with the visually-distinct contact area. In one or more implementations, a visually-distinct contact area created by the process operating within the optimal heat and pressure range indicated by the arrow 508 exhibits a pattern where the Delta E of the pattern versus adjacent separated areas of film is 3.1 points higher on average.

Similarly, in at least one embodiment, a visually-distinct contact area created by the process operating within the optimal heat and pressure range indicated by the arrow 508 exhibits physicals where the peak load ratio of the areas including the visually-distinct contact area is between 38% and 100% of the TD tensile strength the films prior to formation of the visually-distinct contact area when measured on a one-inch TD tensile pull test. More specifically the visually-distinct contact area is between 54% and 100% of the TD tensile strength the films prior to formation of the visually-distinct contact area. In one or more implementations, a visually-distinct contact area created by the process operating within the optimal heat and pressure range indicated by the arrow 508 exhibits physicals where the peak load ratio of the visually-distinct contact area is 92% of the TD tensile strength of the pre-processed film. In at least one embodiment, the visually-distinct contact area created by the process operating within the optimal heat and pressure range indicated by the arrow 508 can also exhibit desired levels of puncture resistance and tear values (in the machine and/or transverse direction).

Moreover, in at least one embodiment, a visually-distinct contact area created by the process operating within the optimal heat and pressure range indicated by the arrow 508 exhibits blocking where the peel strength [g/mm] is between 0.00 and 2.60, between 0.00 and 1.70, or between 0.00 and 0.88 when peel forces are exerted on a three-inch T peel between inner bag layers. Specifically, a visually-distinct contact area created by the process operating with the optimal heat and pressure ranges exhibits blocking where the peel strength [g/mm] is 0.29 when peel forces are exerted on a three-inch T peel between inner bag layers. Additionally, in at least one implementation, the visually-distinct contact areas are configured to separate before any layer of the multi-film film or bag fails when subjected to peel forces.

Additionally, as shown in FIG. 5, a visually-distinct contact area created by the process operating within the optimal heat and pressure range indicated by the arrow 508 also exhibits minimal holes. For example, in at least one embodiment, holes may be identified by inflating the multi-film thermoplastic structure including the visually-distinct contact area and checking for light show-through. Holes and blocking associated with multi-film thermoplastic structure may be minimized while maximizing visual and physicals by operating the process within the heat and pressure range indicated by the arrow 508.

Figure 6A:
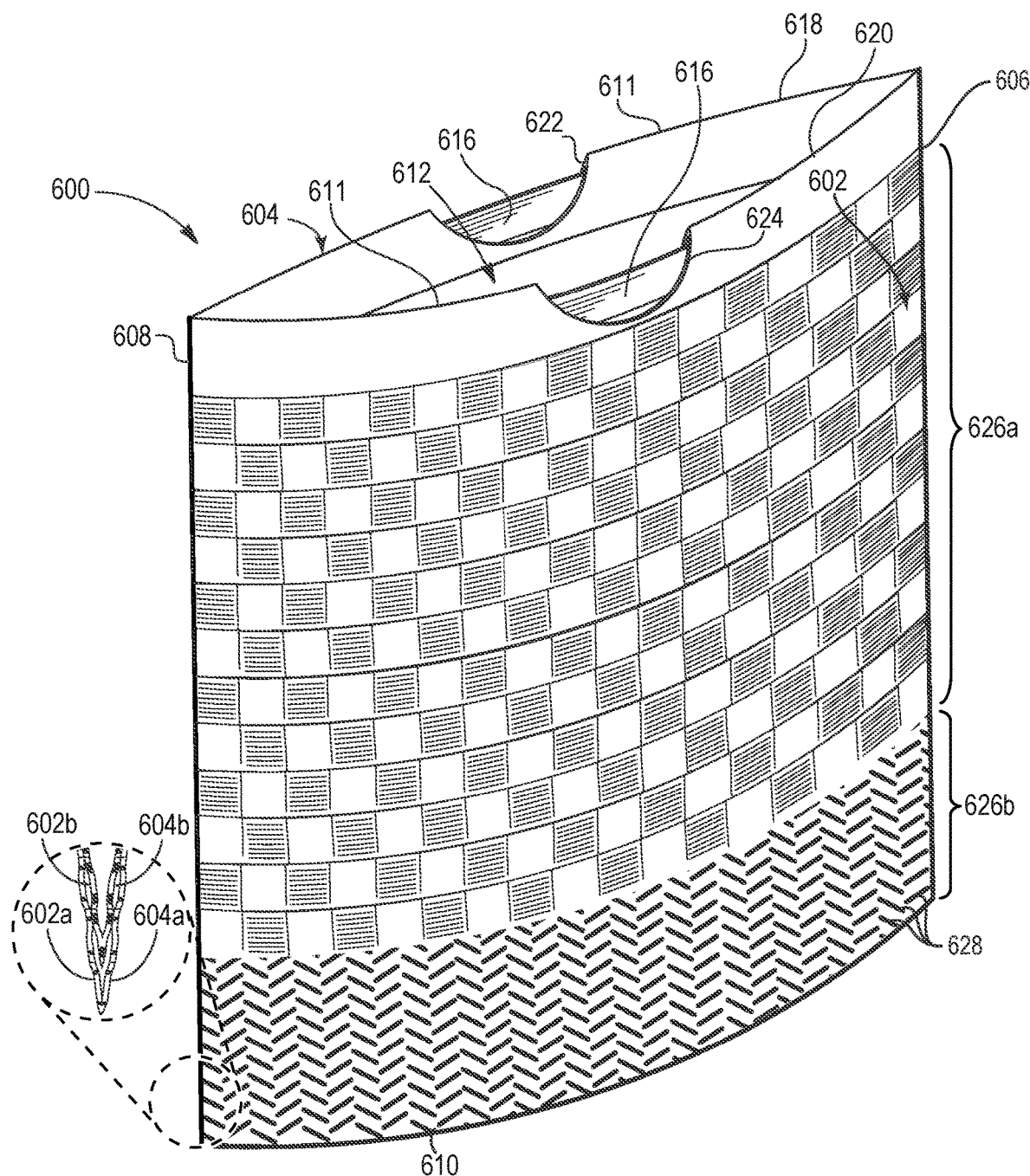
FIG. 6A shows a perspective view of a multi-film thermoplastic bag including a region of visually-distinct contact areas according to one or more implementations of the present disclosure.

As mentioned above, one or more implementations of the present disclosure include products made from or with such multi-film thermoplastic structures. For example, such products include, but are not limited to, grocery bags, trash bags, sacks, and packaging materials, feminine hygiene products, baby diapers, adult incontinence products, or other products. The remaining figures describe various thermoplastic bags including multi-film thermoplastic structures and methods of making the same. For example, FIG. 6A is a perspective view of a multi-film thermoplastic bag 600 according to an implementation of the present disclosure. The multi-film thermoplastic bag 600 includes a first sidewall 602 and a second sidewall 604. Each of the first and second sidewalls 602, 604 includes a first side edge 606, a second opposite side edge 608, a bottom edge 610 extending between the first and second side edges 606, 608, and top edge 611 extending between the first and second side edges 606, 608 opposite the bottom edge. In some implementations, the first sidewall 602 and the second sidewall 604 are joined together along the first side edges 606, the second opposite side edges 608, and the bottom edges 610. The first and second sidewalls 602, 604 may be joined along the first and second side edges 606, 608 and bottom edges 610 by any suitable process such as, for example, a heated pressure seal. In alternative implementations, the first and second sidewalls 602, 604 may not be joined along the side edges. Rather, the first and second sidewalls 602, 604 may be a single uniform piece. In other words, the first and second sidewalls 602, 604 may form a sleeve or a balloon structure.

In some implementations, the bottom edge 610 or one or more of the side edges 606, 608 can comprise a fold. In other words, the first and second sidewalls 602, 604 may comprise a single unitary piece of material. The top edges 611 of the first and second sidewalls 602, 604 may define an opening 612 to an interior of the multi-film thermoplastic bag 600. In other words, the opening 612 may be oriented opposite the bottom edge 610 of the multi-film thermoplastic bag 600. Furthermore, when placed in a trash receptacle, the top edges 611 of the first and second sidewalls 602, 604 may be folded over the rim of the receptacle.

In some implementations, the multi-film thermoplastic bag 600 pattern may optionally include a closure mechanism located adjacent to the top edges 611 for sealing the top of the multi-film thermoplastic bag 600 to form an at least substantially fully-enclosed container or vessel. As shown in FIG. 6A, in some implementations, the closure mechanism comprises a draw tape 616, a first hem 618, and a second hem 620. In particular, the first top edge 611 of the first sidewall 602 may be folded back into the interior volume and may be attached to an interior surface of the first sidewall 602 to form the first hem 618. Similarly, the second top edge 611 of the second sidewall 604 is folded back into the interior volume and may be attached to an interior surface of the second sidewall 604 to form a second hem 620. The draw tape 616 extends through the first and second hems 618, 620 along the first and second top edges 611. The first hem 618 includes a first aperture 622 (e.g., notch) extending through the first hem 618 and exposing a portion of the draw tape 616. Similarly, the second hem 620 includes a second aperture 624 extending through the second hem 620 and exposing another portion of the draw tape 616. During use, pulling the draw tape 616 through the first and second apertures 622, 624 will cause the first and second top edge 611 to constrict. As a result, pulling the draw tape 616 through the first and second apertures 622, 624 will cause the opening 612 of the multi-film thermoplastic bag 600 to at least partially close or reduce in size. The draw tape closure mechanism may be used with any of the implementations of a reinforced multi-film thermoplastic bag described herein.

Although the multi-film thermoplastic bag 600 is described herein as including a draw tape closure mechanism, one of ordinary skill in the art will readily recognize that other closure mechanisms may be implemented into the multi-film thermoplastic bag 600. For example, in some implementations, the closure mechanism may include one or more of flaps, adhesive tapes, a tuck and fold closure, an interlocking closure, a slider closure, a zipper closure, or any other closure structures known to those skilled in the art for closing a bag.

Each of the sidewalls 602, 604 of the thermoplastic bag 600 comprise a multi-film thermoplastic structure, such as that shown in FIG. 2. Thus, each sidewall 602, 604 includes an inner layer and an outer layer. Indeed, the thermoplastic bag 600 has a bag-in-bag structure. In other words, the thermoplastic bag 600 includes a first bag and a second bag positioned therein. More particular, the first thermoplastic bag comprises first and second opposing sidewalls 602*a*, 604*a* joined together along a first side edge, an opposite second side edge, and a closed bottom edge. The second thermoplastic bag is positioned within the first thermoplastic bag. The second thermoplastic bag comprises third and fourth opposing sidewalls 602*b*, 604*b* joined together along a first side edge, an opposite second side edge, and a closed bottom edge. In one or more implementations, the first thermoplastic bag (e.g., the outer layer) is pigmented with a first color the second thermoplastic bag (e.g., the inner layer is pigmented with a second color). As described above, the differing colors of the layers can allow for the creation of visually-distinct contact areas when the inner bag and the outer bag are placed into intimate contact.

As shown in FIG. 6A, the multi-film thermoplastic bag 600 includes a first region 626*a* and a second region 626*b*. In the implementation shown, the second region 626*b* includes a pattern of visually-distinct contact areas 628. The pattern of visually-distinct contact areas 628 shown in FIG. 6A includes a medium pattern density. Additionally, the second region 626*b* covers the bottom one-third of the multi-film thermoplastic bag 600. In at least one implementation the bottom one-third of the multi-film thermoplastic bag 600 is a flat portion of the multi-film thermoplastic bag 600. Additionally, in at least one implementation, the pattern of visually-distinct contact areas 628 is registered to the same location on the second sidewall 604 of the multi-film thermoplastic bag 600. In one or more implementations, the first region 626*a* includes SELF'ed or ring rolled patterns. For example, as shown in FIG. 6A, the first region 626*a* includes a checkerboard pattern of SELF'ed squares as described in U.S. Patent Application No. 62/583,108 filed on Nov. 8, 2017 and entitled "THERMOPLASTIC FILMS AND BAGS WITH COMPLEX STRETCH PATTERNS AND METHODS OF MAKING THE SAME, hereby incorporated by reference in its entirety.

As shown by FIG. 6A, the checkboard pattern of deformations can comprise a repeating pattern of raised rib-like elements. In particular, the checkboard pattern of deformations can include a first plurality of rib-like elements arranged pattern. Portions of the raised rib-like elements of the outer layer can be in direct contact and have the appearance of the inner of the bag 600. In contrast to the visually-distinct contact areas 628, however, the portions of deformations (e.g., raised rib-like element of a SELFing pattern or alternating thicker ribs and thinner stretched webs of a ring rolling pattern) modify the physical properties of the film and include areas of varying gauge or thickness.

In one or more implementations, it is desirable to have more thermoplastic material in areas of the bag 600 susceptible to leaks or other failures. For example, the second region 626*b* lacks deformations and is otherwise less stretched relative to the first region 626*a*. The additional gauge can reinforce the second region 626*b* and help reduce failure. The pattern of visually-distinct contact areas in the second region 626*b* provide the region with pleasing aesthetics without substantially changing the gauge of the films in the second region 626*b*.

In additional alternative embodiments, the pattern of visually-distinct contact areas 628 can include a gradient pattern across the bottom edge 610 (e.g., the fold of the multi-film thermoplastic bag 600). Additionally, the pattern of visually-distinct contact areas 628 can be located in any zone of the multi-film thermoplastic bag 600. For example, the pattern of visually-distinct contact areas 628 can be location at the first hem 618, the second hem 620, along the first side edge 606 or the second side edge 608, or at any other zone of the multi-film thermoplastic bag 600. Moreover, the pattern of visually-distinct contact areas 628 can be sized at 0-24 inches, and can cover 0-100% of the multi-film thermoplastic bag 600.

The thermoplastic bag 600, as shown, includes side heat seals along the side edges 606, 608. As shown, the side heat seals can comprise areas in which all four layers of the thermoplastic bag are in intimate contact. As such, the side heat seal (and any other heat seals such as a hem seal) can have the same appearance as the visually-distinct contact areas. Heat seals differ from the visually-distinct contact areas in that the heat seals will not separate prior to failure of the thermoplastic films bonded by the heat seals.

Figure 6B:
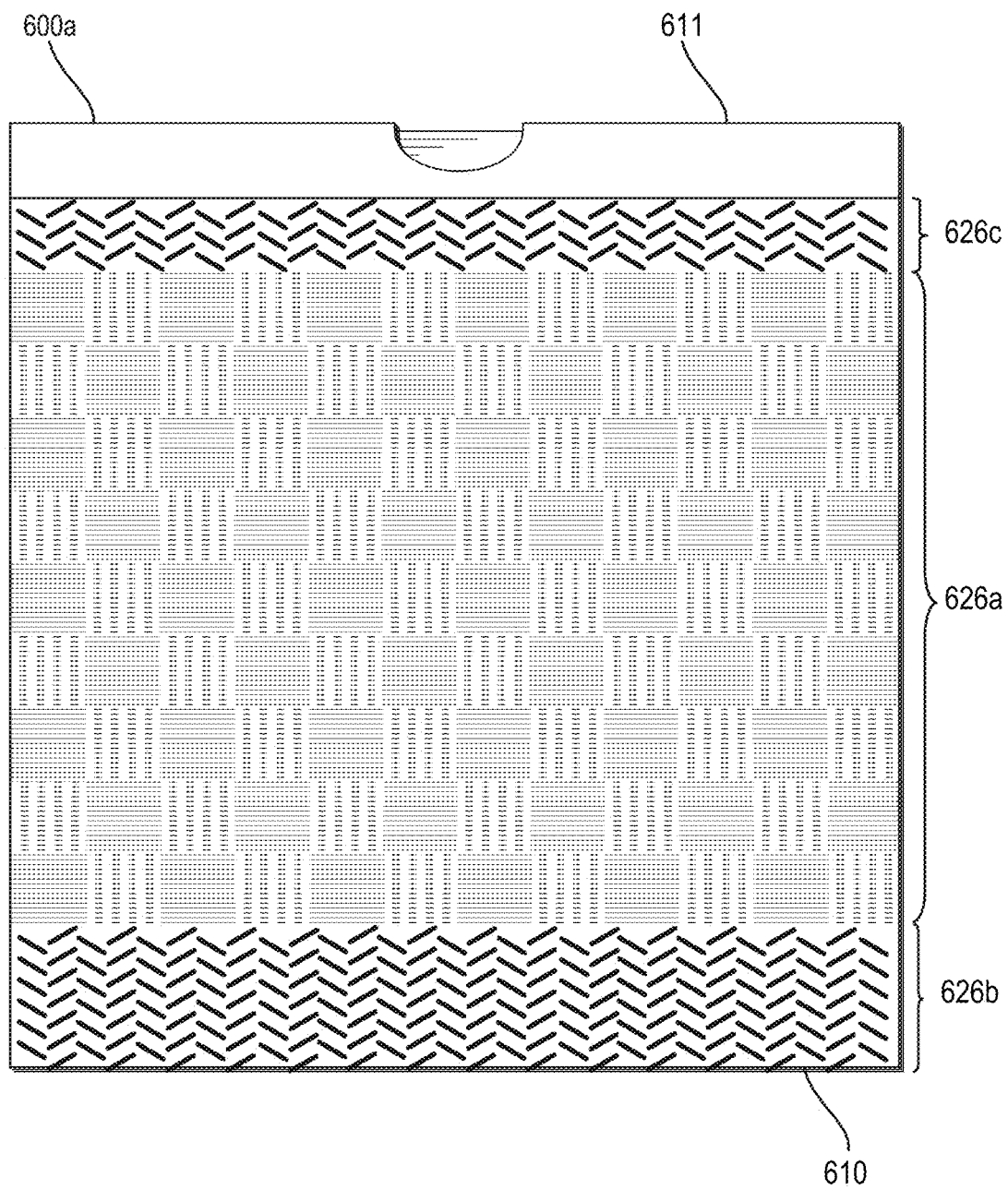
FIG. 6B shows a front view of a multi-film thermoplastic bag including two regions of visually-distinct contact areas according to one or more implementations of the present disclosure.

As mentioned above, the methods herein can impart a pattern of visually-distinct contact areas onto multiple regions of a multi-film thermoplastic structure or bag. For example, FIG. 6B illustrates a multi-film thermoplastic bag 600*a* with a first region 626*a*, a second region 626*b*, and a third region 626*c*. As shown, and similar to FIG. 6A, the first region 626*a* includes a checkerboard pattern of SELF'ed squares. The second region 626*b* and the third region 626*c* include the chevron pattern of visually-distinct contact areas, discussed above.

In one or more embodiments, placing the chevron pattern of visually-distinct contact areas within the second region 626*b* near the bottom edge 610 of the multi-film thermoplastic bag 600*a* and the third region 626*c* near the top edge 611 of the multi-film thermoplastic bag 600*a* is advantageous. For example, as discussed above, the patterns of visually-distinct contact areas create a consumer impression of thickness (e.g., consumers view these portions as having an increased caliper or thickness). Thus, placing these patterns of visually-distinct contact areas within the multi-film thermoplastic bag 600*a* in areas where a high amount of strain occurs (e.g., because of heavy pull near the top or heavy weight near the bottom) creates an assurance in the mind of a consumer that the multi-film thermoplastic bag 600*a* will not fail.

Figure 7:
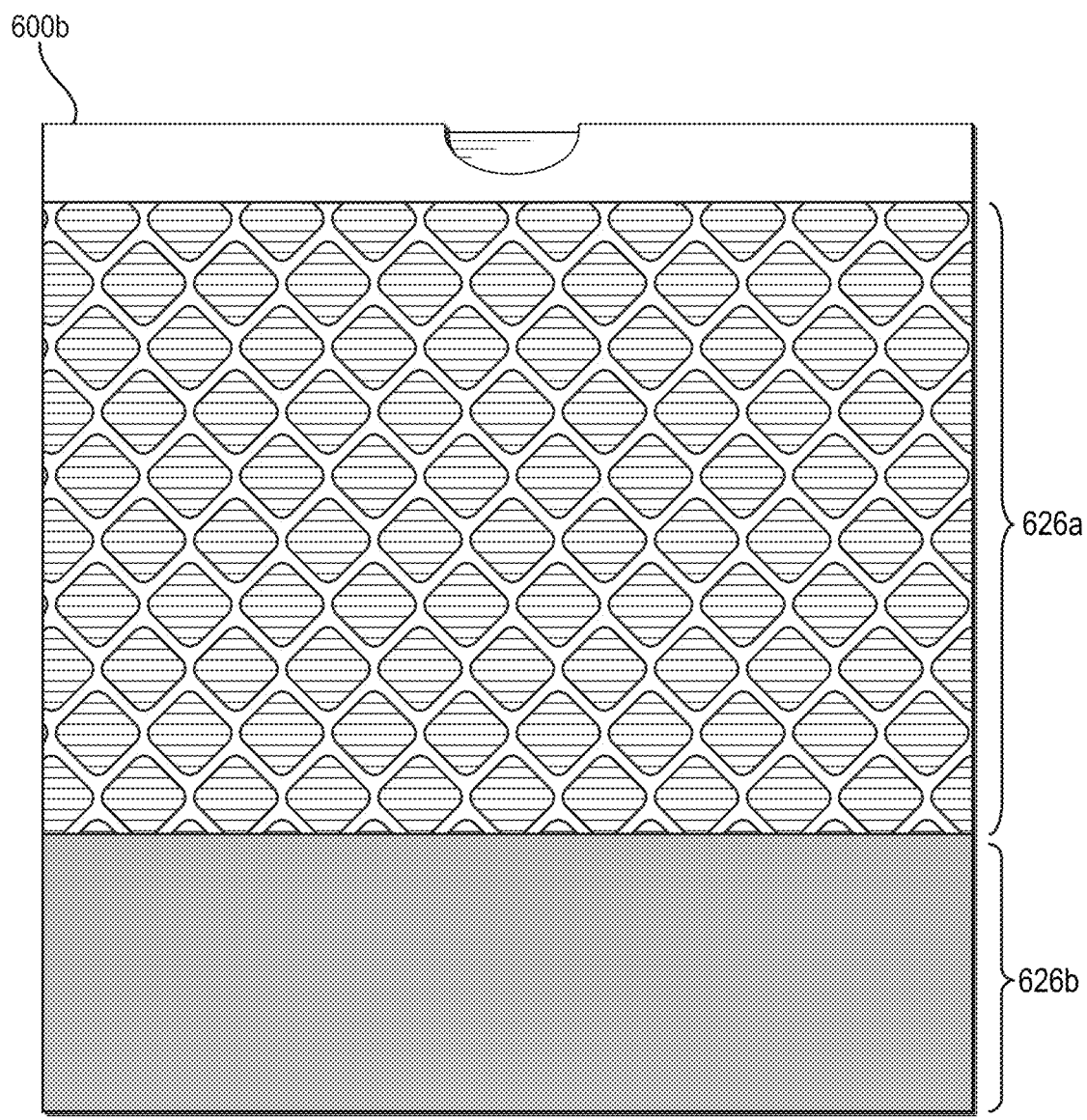
FIG. 7 shows a front view of a multi-film thermoplastic bag including a region having a continuous, visually-distinct area according to one or more implementations of the present disclosure.

As discussed above, the methods herein can impart a pattern of visually-distinct contact areas onto a region of a multi-film thermoplastic structure or bag. Additionally, in one or more implementations, the methods described herein can also impart a continuous region of visually-distinct contact area within a flat portion of a multi-film thermoplastic structure or bag. For example, FIG. 7 illustrates a multi-film thermoplastic bag 600*b* including a first region 626*a* and a second region 626*b*. As shown, the first region 626*a* includes a pattern of raised rib-like elements formed by SELF'ing. The second region 626*b* includes a solid region of visually-distinct contact area between the first and second flat portions of the multi-film thermoplastic bag 600b. In particular, the visually-distinct contact area is a continuous contact area that extends from one side to an opposing opposite side of the bag.

Figure 8:
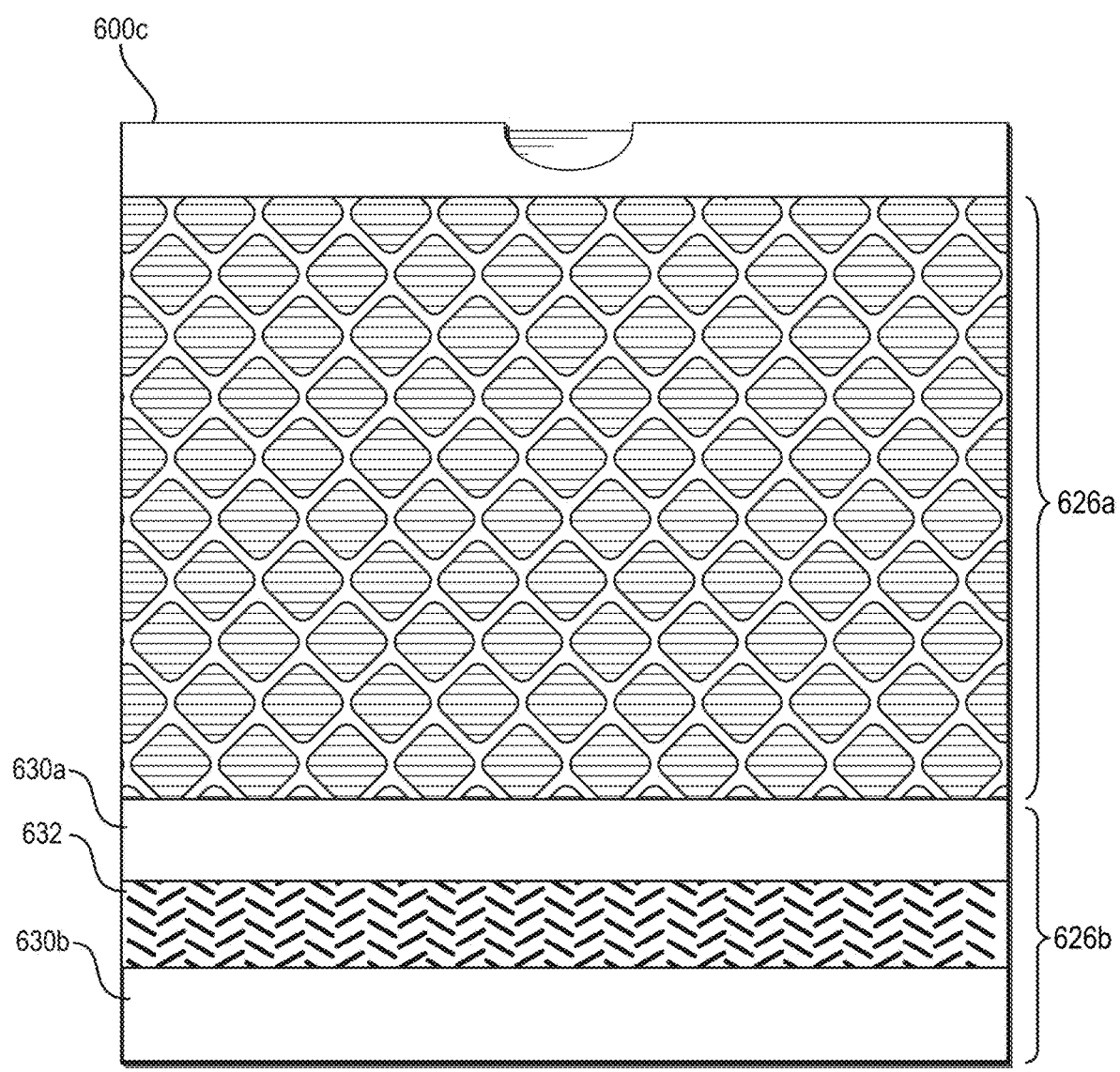
FIG. 8 shows a front view of a multi-film thermoplastic bag including a region of a visually-distinct contact areas according to one or more implementations of the present disclosure.

As mentioned above, implementations of the present multi-film thermoplastic bag may include regions of visually-distinct contact areas that cover any percentage of the multi-film thermoplastic bag. For example, FIG. 8 includes a multi-film thermoplastic bag 600c with a first region 626a and a second region 626b. The first region 626a may include a pattern of raised rib-like elements formed by SELF'ing or ring rolling. As shown, the second region 626b includes flat portions of the layers of the multi-film thermoplastic bag 600c with separated regions 630a, 630b surrounding a centralized visually-distinct contact area 632.

Figure 9:
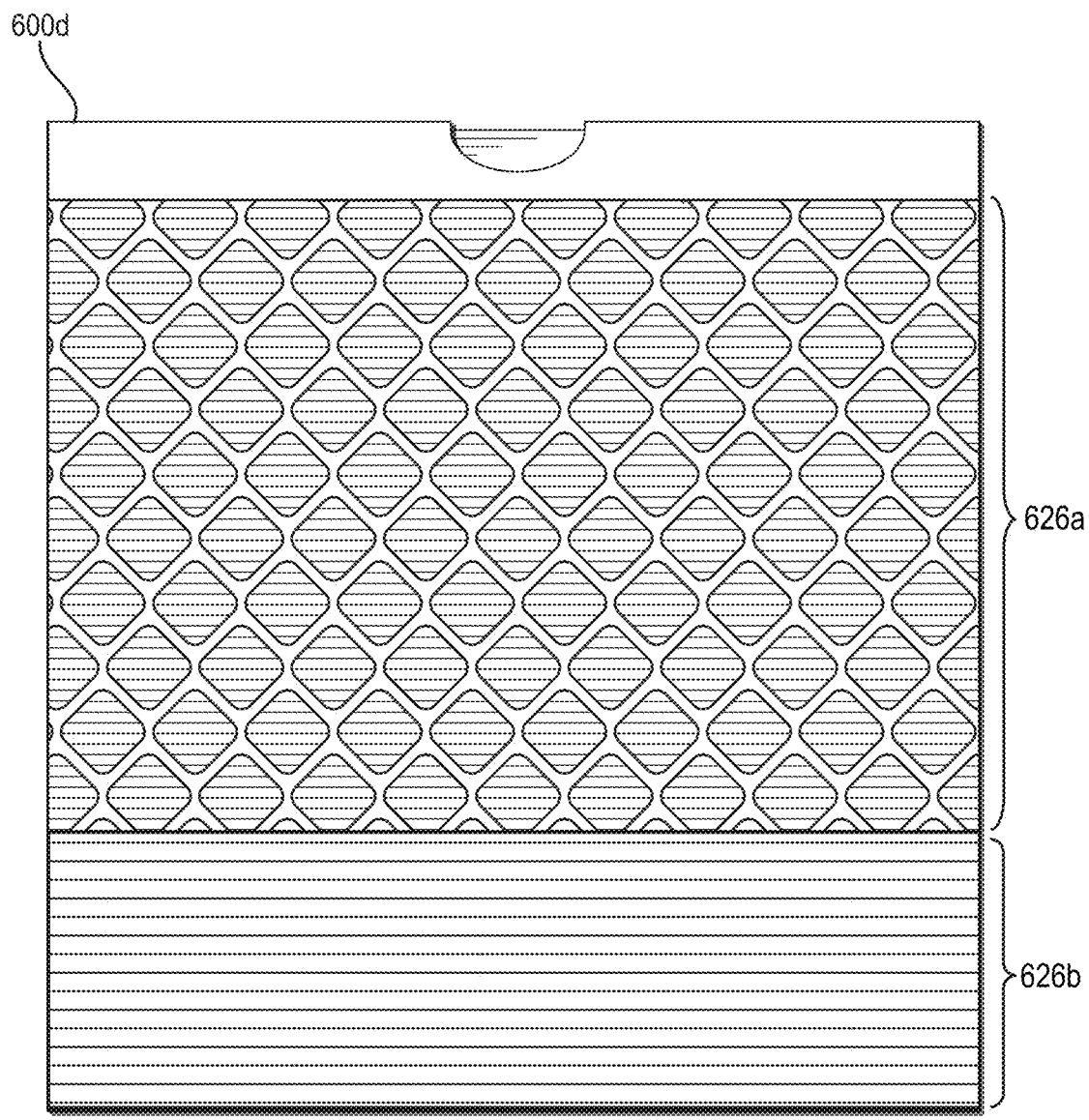
FIG. 9 shows a front view of a multi-film thermoplastic bag including a region of visually-distinct contact areas according to one or more implementations of the present disclosure.

The visually-distinct contact areas of one or more implementations can cover a continuous region (e.g., as discussed with regard to FIG. 7), or may be patterned. FIG. 9 illustrates an additional pattern of visually-distinct contact areas imparted onto a multi-film thermoplastic bag 600d. For example, as shown, the multi-film thermoplastic bag 600d includes a first region 626a and a second region 626b. As with the implementations illustrated in FIGS. 6, 7, and 8, the first region 626a may include a pattern of raised rib-like elements formed by SELF'ing or ring rolling. As shown in FIG. 9, the second region 626b may include a pattern of visually-distinct contact areas where each visually-distinct contact area is horizontally spaced along the width of the multi-film thermoplastic bag 600d. In alternative implementations, the visually-distinct contact areas may cover any percentage of the multi-film thermoplastic bag 600d and may be positioned and spaced in any pattern with any level of visually-distinct contact area density.

Figure 10:
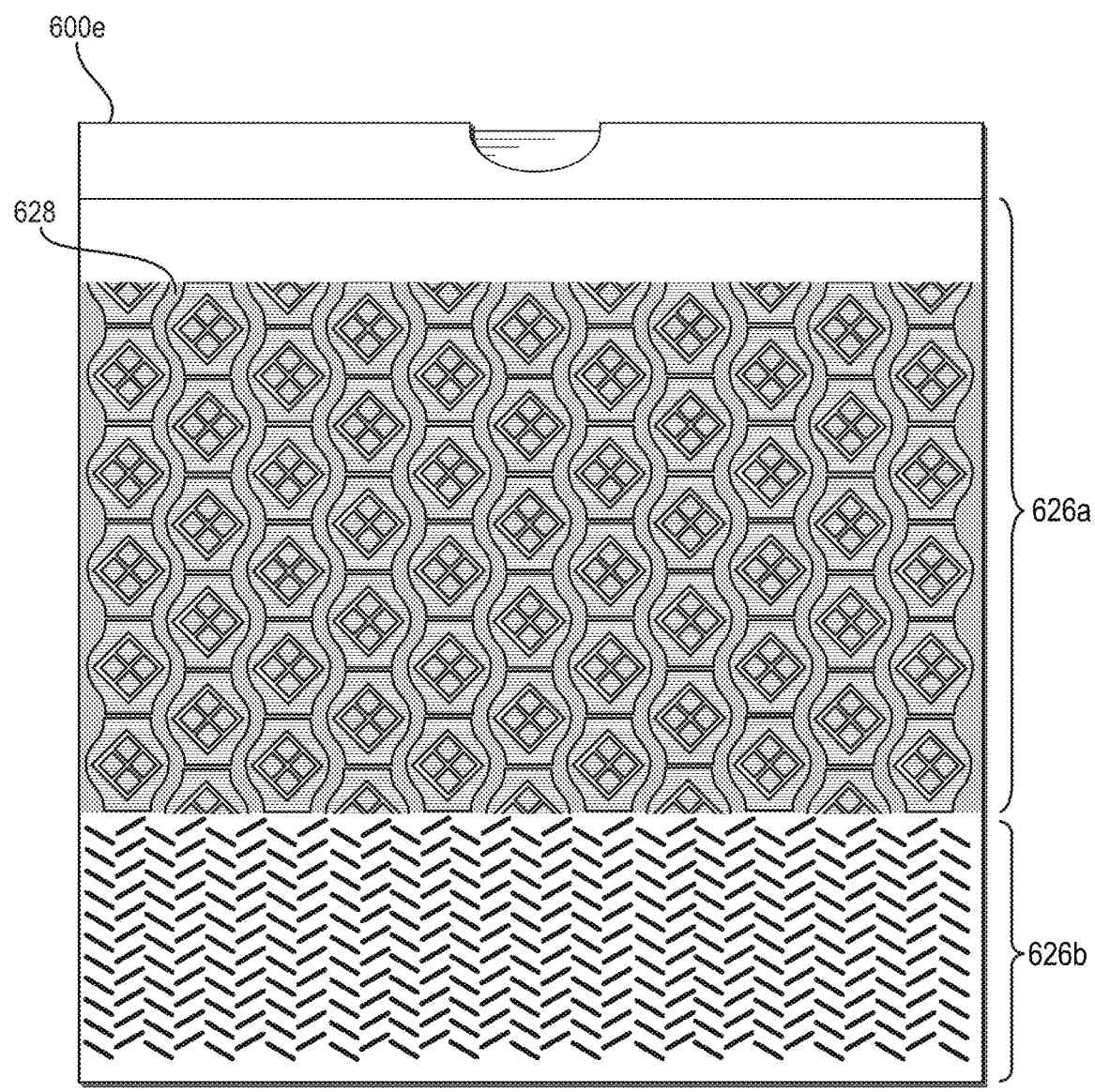
FIG. 10 shows a front view of a multi-film thermoplastic bag including a region of a visually-distinct contact areas according to one or more implementations of the present disclosure.
Figure 11A:
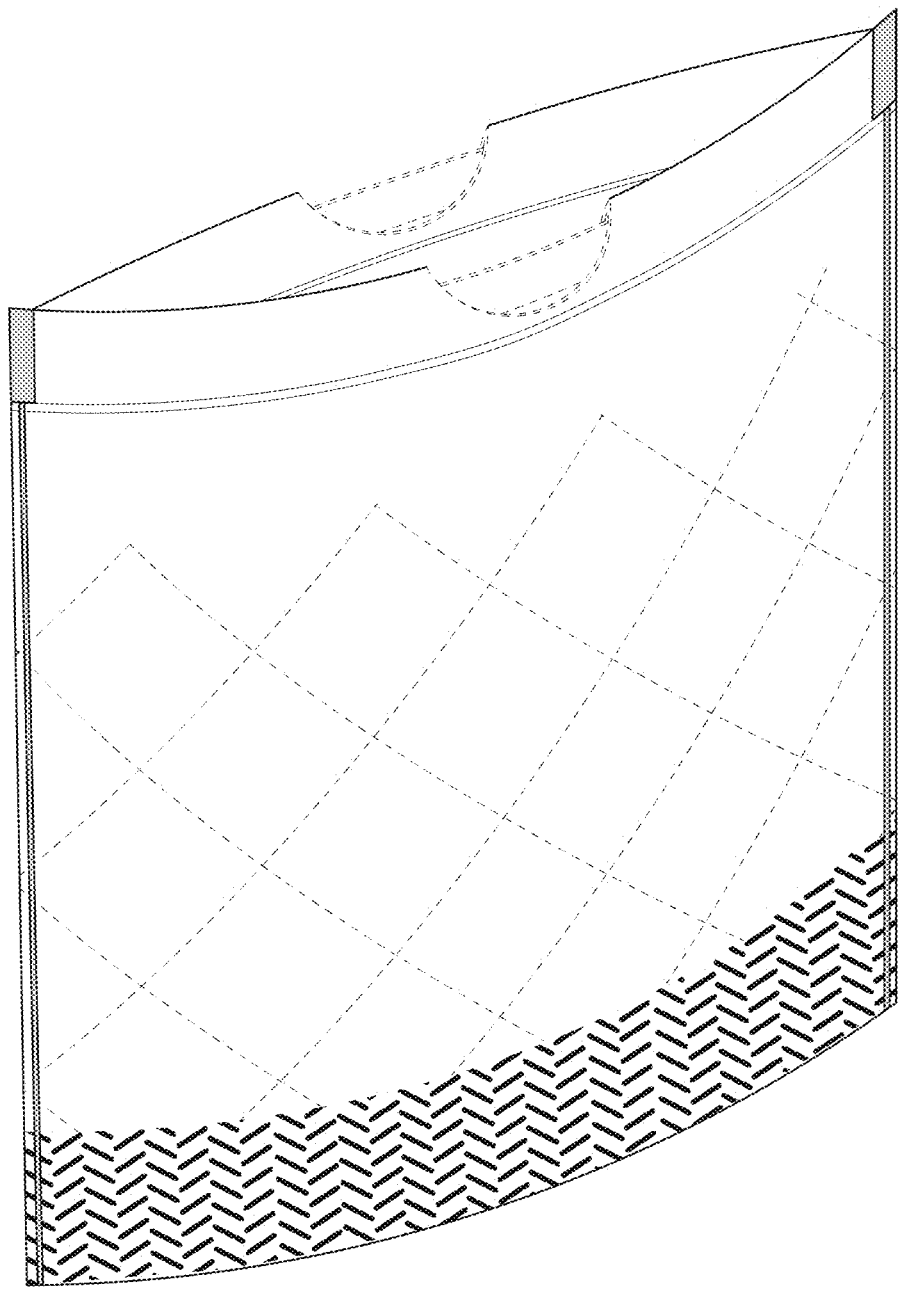
FIGS. 11A-11F illustrate a perspective view, a front view, a back view, a side view, a top view, and a bottom view, respectively, of a multi-film thermoplastic bag including a region of a visually-distinct contact areas according to one or more implementations of the present disclosure.
Figure 11B:
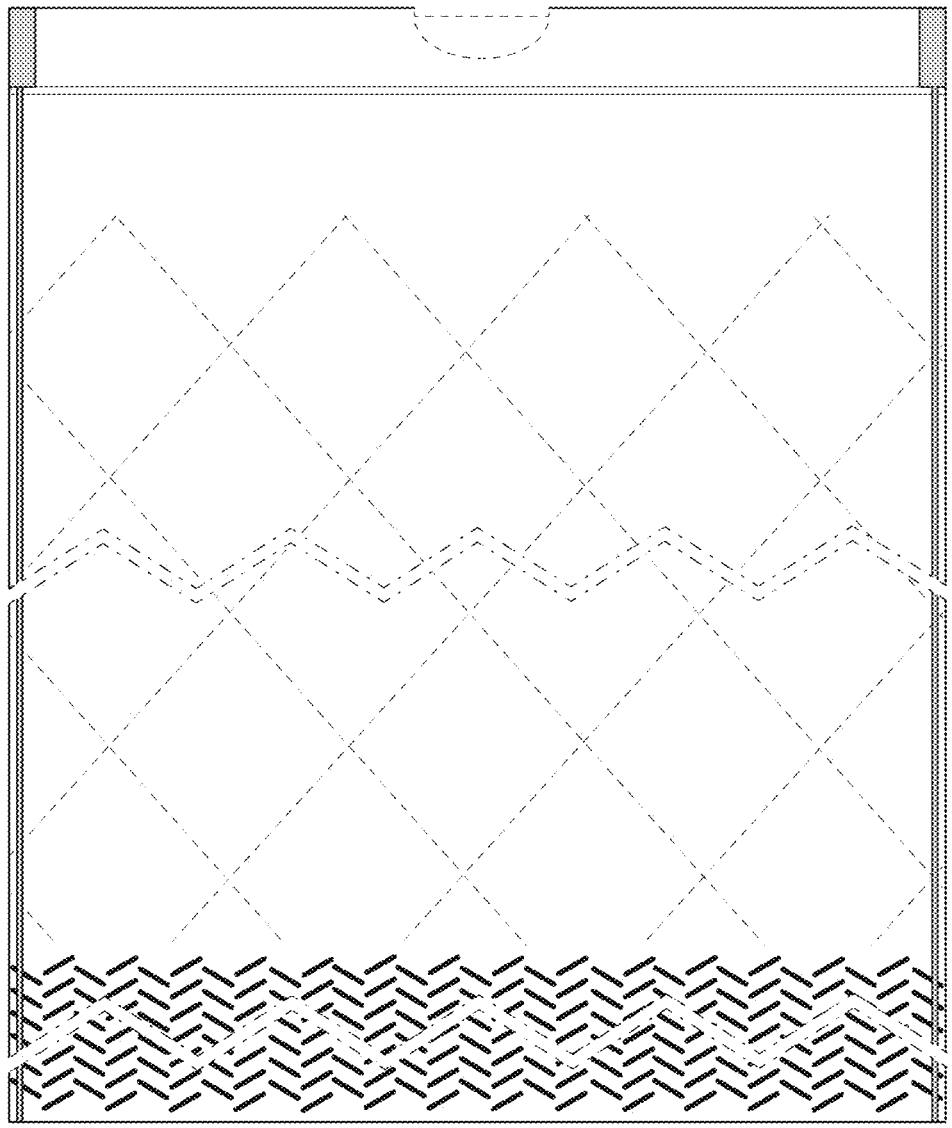
Figure 11C:
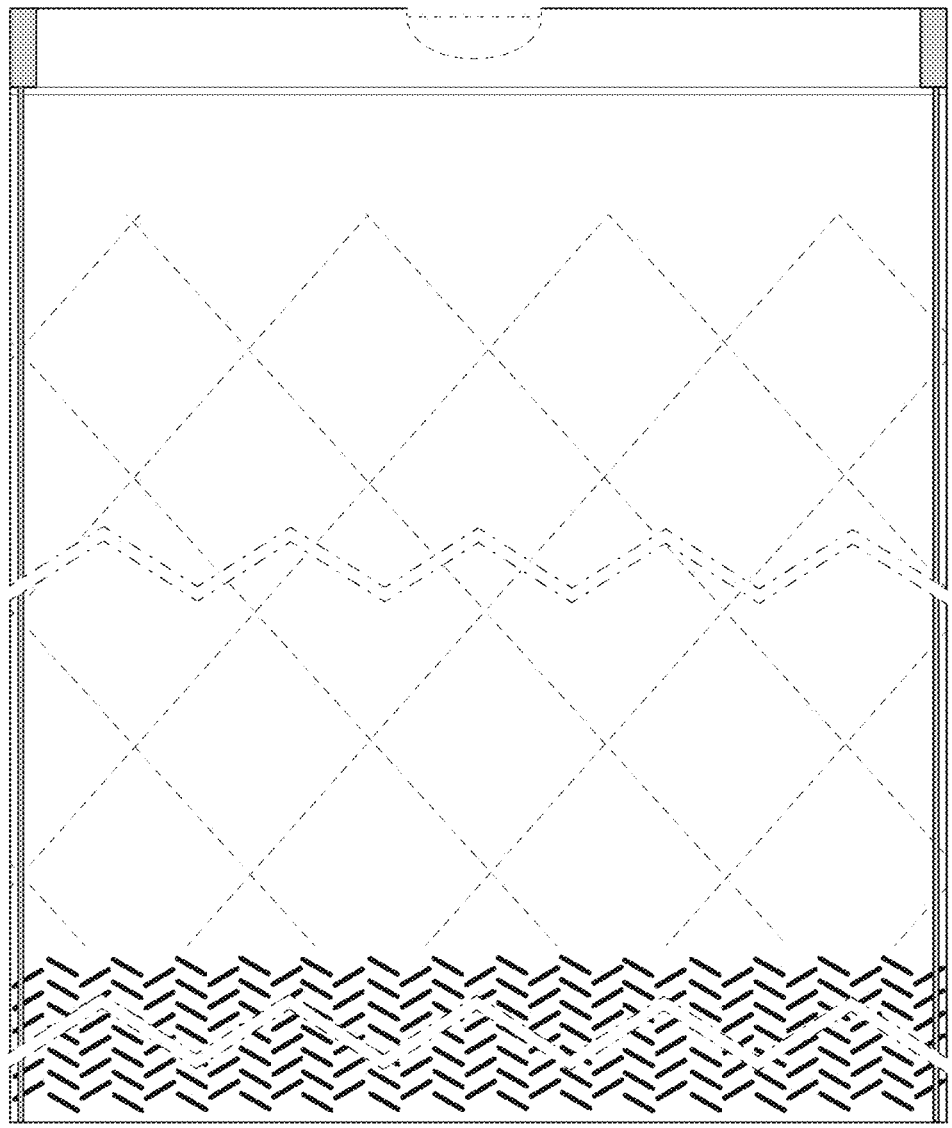
Figure 11D:
Figure 11E:
Figure 11F:

The pattern of elements (e.g., raised rib-like elements, etc.) in the first region of a multi-film thermoplastic bag can be any pattern. For example, FIG. 10 illustrates a multi-film thermoplastic bag 600e with a first region 626a and a second region 626b. As shown, the first region 626a includes a pattern of elements that includes diamonds and wavy lines. Additionally, the pattern of elements can take up any percentage of the first region 626a. The second region 626b includes the chevron pattern of visually-distinct contact areas, discussed above. In alternative embodiments, the multi-film thermoplastic bag 600e can include a single region with a single pattern of visually-distinct contact areas. In further alternative embodiments, the multi-film thermoplastic bag 600e can include a single region of a continuous visually-distinct contact area (e.g., giving the bag 600e a single color).

Furthermore, as shown by FIG. 10, in one or more implementations, the visually-distinct contact areas 628 can be nested within, or otherwise integrated with, a SELF'ing or ring rolling pattern. In particular, the first region 626a includes a SELFing pattern of bulbous areas with nested diamonds. Wavy land areas separate the SELFing patterns. In the implementation shown in FIG. 10, the wavy land areas are visually-distinct contact areas 628. In particular, the techniques described in U.S. Pat. No. 62,798,259 filed on Jan. 29, 2019 and entitled "THERMOPLASTIC BAGS WITH PHASED DEFORMATION PATTERNS, hereby incorporated by reference in its entirety.

Although the implementations shown in FIGS. 6-10 show multi-film thermoplastic bags with two regions, additional or alternative implementations can include a single region or more than two regions. Additionally, although the implementations shown in FIGS. 6-10 illustrate at least one continuous pattern of visually-distinct contact areas with one or more MD stripes, other implementations can include a discrete pattern of visually-distinct contact areas. For example, alternative implementations can include a discrete pattern of visually-distinct contact areas with MD, TD, or angled orientation including pattern elements resembling dots, dashes, or any other shapes.

FIGS. 11A-11F illustrate views of an example bag with visually-distinct contact areas. The breaks in the bag indicate that the various sections are of indeterminate length. Similarly, the example bag can have indeterminate width. In other words, depending upon the capacity of the bag or the intended trash receptacle in which the bag is to be placed, the bag can have differing lengths or widths from those shown in the drawings. Additionally, as shown by a comparison of FIGS. 11B and 11C, in one or more embodiments, the pattern of visually-distinct contact areas on a first side of the bag is a mirror image of the pattern of visually-distinct contact areas on the opposing side of the bag. The dashed diamond pattern indicates that the bag with a pattern of visually-distinct contact areas can include one or more sections with cold deformation (e.g., SELFing or ring rolling).

Figure 12:
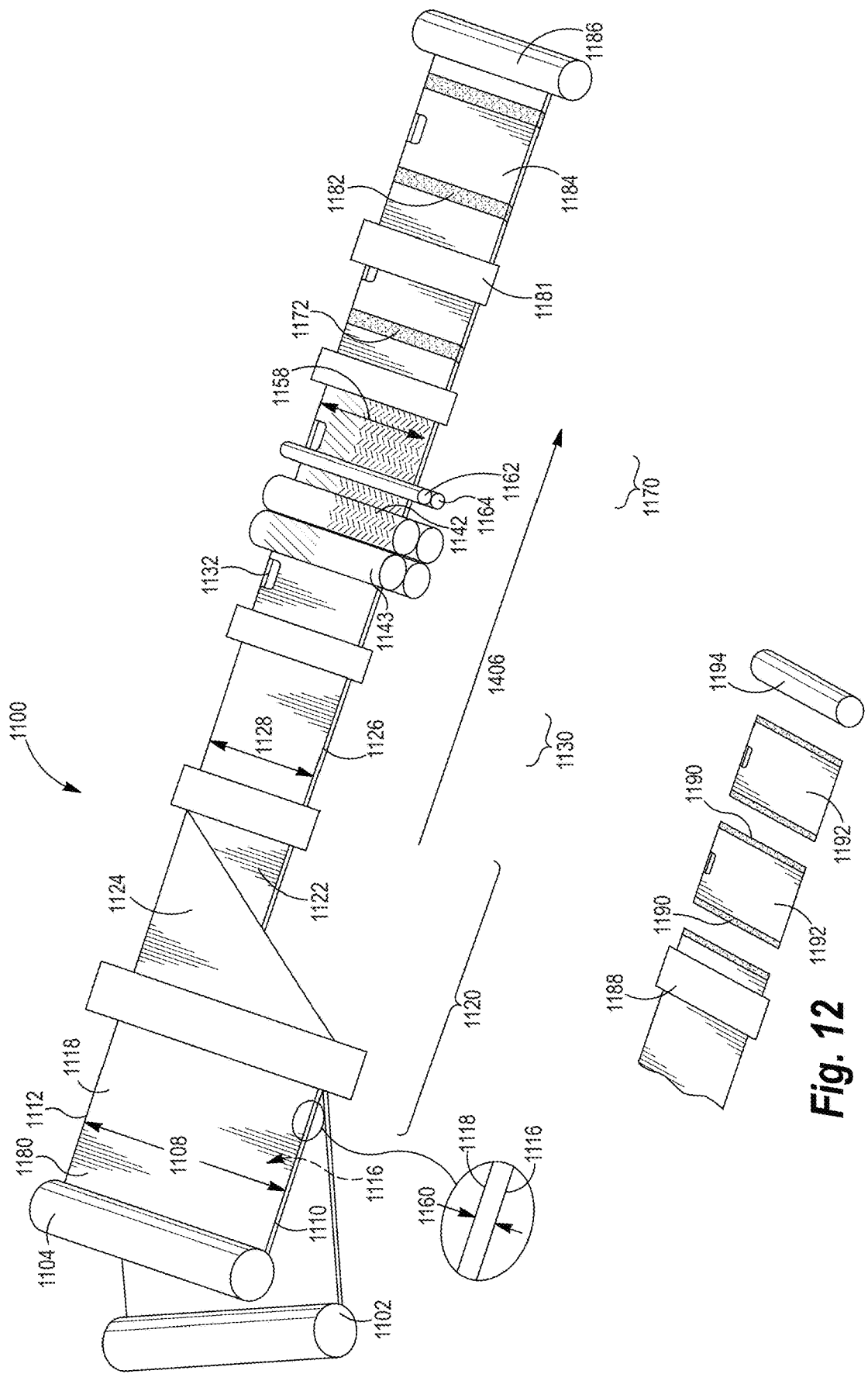
FIG. 12 illustrates a schematic diagram of a process of manufacturing a multi-film thermoplastic bag with visually-distinct contact areas in accordance with one or more implementations of the present disclosure.

To produce a bag having one or more visually-distinct contact areas as described, continuous webs of thermoplastic material may be processed through a high-speed manufacturing environment such as that illustrated in FIG. 12. In the illustrated process 1100, production may begin by unwinding a first continuous web or film 1180 of thermoplastic sheet material from a roll 1104 and advancing the web along a machine direction 1106. The unwound web 1180 may have a width 1108 that may be perpendicular to the machine direction 1106, as measured between a first edge 1110 and an opposite second edge 1112. The unwound web 1180 may have an initial average thickness 1160 measured between a first surface 1116 and a second surface 1118. In other manufacturing environments, the web 1180 may be provided in other forms or even extruded directly from a thermoplastic forming process. involves unwinding a second continuous web or film 1196 of thermoplastic sheet material from a roll 1102 and advancing the web along a machine direction 1106. The second film 1196 can comprise a thermoplastic material, a width, and/or a thickness that is similar or the same as the first film 1180. In alternative one or more implementations, one or more of the thermoplastic material, width, and/or thickness of the second film 1196 can differ from that of the first film 1180. To provide the first and second sidewalls of the finished bag, the films 1180, 1196 may be folded into a first half 1122 and an opposing second half 1124 about the machine direction 1106 by a folding operation 1120. When so folded, the first edge 1110 may be moved adjacent to the second edge 1112 of the web. Accordingly, the width of the films 1180, 1196 proceeding in the machine direction 1106 after the folding operation 1120 may be a width 1128 that may be half the initial width 1108. As may be appreciated, the portion mid-width of the unwound films 1180, 1196 may become the outer edge of the folded films 1180, 1196. In any event, the hems may be formed along the adjacent first and second edges 1110, 1112 and a draw tape 1132 may be inserted during a hem and draw tape operation 1130.

To form one or more regions of visually-distinct contact areas in a multi-film thermoplastic bag, the processing equipment may include at least one set of contact rollers 1142 where at least one of the rolls is heated, such as those described herein above. Referring to FIG. 12, the folded web 1180 may be advanced along the machine direction 1106 between intermeshing rollers 1143 (e.g., ring rolls, SELFing rollers, or embossing rollers), which impart a pattern of elements in one portion, zone, area, or section of the resulting multi-film thermoplastic bag. The folded web 1180 may then advance through the contact rollers 1142, which impart a region of visually-distinct contact areas to the resulting multi-film thermoplastic bag. As shown in FIG. 12, the pattern of the intermeshing rollers 1143 may be offset from the pattern of the contact rollers 1142, such that the patterns imparted to the resulting multi-film thermoplastic bag do not overlap.

As mentioned above, in one or more implementations, one of the contact rollers 1142 is heated (e.g., a metal contact roller) while other contact roller is unheated (e.g., a rubber contact roller). In such implementations, having heat being applied to the one side of the films 1180, 1196 can cause the visually-distinct contact areas on that heated side be more visually distinct (e.g., darker) and/or have more blocking between the layers on the headed side.

In at least one embodiment, the processing equipment may include a vision system or sensor system in connection with the contact rollers 1142. For example, the vision system or sensor system may detect pattern presence, placements, and darkness. Similarly, the sensor system may detect the TD placement of the film (e.g., similar to web breakout or guiding systems). Additionally, the processing equipment may include a force gauge probe to measure the drag of the film across the gauge between inner layers.

To avert imparting a pattern (e.g., of visually-distinct contact areas or otherwise) onto the portion of the web that includes the draw tape 1132, the corresponding ends of the rollers 1142, 1143 may be smooth and without ridges, grooves, punch elements, or die elements. Thus, the adjacent edges 1110, 1112 and the corresponding portion of the web proximate those edges that pass between the smooth ends of the rollers 1142, 1143 may not be imparted with any pattern. In alternative implementations, the intermeshing rollers (if present) and the contact rollers are positioned prior to the drawtape insertion process.

The processing equipment may include pinch rollers 1162, 1164 to accommodate the width 1158 of the web 1180. In one or more implementations, the nip rollers can be modified into contact rollers to produce visually-distinct contact areas. For example, in implementations with continuous visually-distinct contact areas, at least one of the pinch rollers 1162, 1164 can be heated and act as contact rollers.

In one more implementations, the heat and pressure of the contact rollers can ensure that there is little to no bonding between the folded halves 1122, 1124 to ensure that the bag 1184 can be opened.

To produce the finished bag, the processing equipment may further process the folded web with at least one region of visually-distinct contact areas. For example, to form the parallel side edges of the finished multi-film thermoplastic bag, the web may proceed through a sealing operation 1170 in which heat seals 1172 may be formed between the folded edge 1126 and the adjacent edges 1110, 1112. The heat seals may fuse together the adjacent halves 1122, 1124 of the folded web. The heat seals 1172 may be spaced apart along the folded web and in conjunction with the folded outer edge 1126 may define individual bags. The heat seals may be made with a heating device, such as, a heated knife. A perforating operation 1181 may perforate 1182 the heat seals 1172 with a perforating device, such as, a perforating knife so that individual bags 1190 may be separated from the web. In one or more implementations, the webs may be folded one or more times before the folded webs may be directed through the perforating operation. The web 1180 embodying the bags 1184 may be wound into a roll 1186 for packaging and distribution. For example, the roll 1186 may be placed in a box or a bag for sale to a customer.

In one or more implementations of the process, a cutting operation 1188 may replace the perforating operation 1180. The web is directed through a cutting operation 1188 which cuts the webs at location 1190 into individual bags 1192 prior to winding onto a roll 1194 for packaging and distribution. For example, the roll 1194 may be placed in a box or bag for sale to a customer. The bags may be interleaved prior to winding into the roll 1194. In one or more implementations, the web may be folded one or more times before the folded web is cut into individual bags. In one or more implementations, the bags 1192 may be positioned in a box or bag, and not onto the roll 1194.

Figure 13:
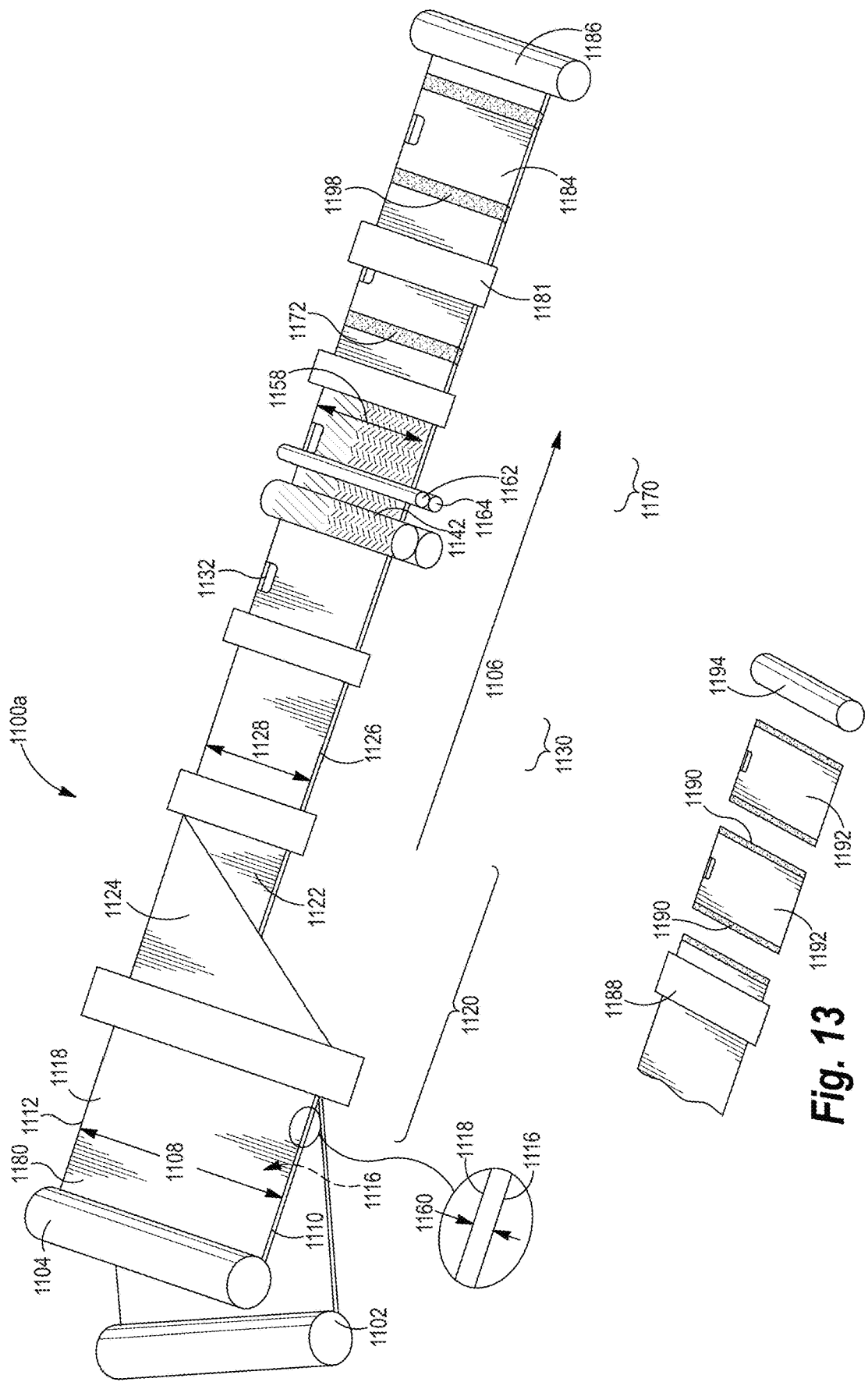
FIG. 13 illustrates a schematic diagram of another process of manufacturing a multi-film thermoplastic bag with visually-distinct contact areas in accordance with one or more implementations of the present disclosure.

FIG. 13 illustrates a modified high-speed manufacturing 1100*a* that involves unwinding a second continuous web or film 1196 of thermoplastic sheet material from a roll 1102 and advancing the web along a machine direction 1106. The second film 1196 can comprise a thermoplastic material, a width, and/or a thickness that is similar or the same as the first film 1180. In alternative one or more implementations, one or more of the thermoplastic material, width, and/or thickness of the second film 1196 can differ from that of the first film 1180. The films 1180, 1196 can be folded together during the folding operation 1120 such that they pass through the contact rollers 1142 to form one or more regions of visually-distinct contact areas and resulting multi-filmed thermoplastic bags.

As shown by FIG. 13, the contact rollers can comprise hybrid rollers with a first portion that form visually-distinct contact areas and a second area that form deformations (e.g., ring rolling, SELFing, embossing). Furthermore, while the contact rollers 1142 are shown after the draw tape insertion process, in alternative implementations the contact rollers 1142 can be positioned after the folding processes 1120 or another position in the process 1100*a*. For example, FIGS. 12 and 13 illustrate the contact rollers 1142 being position after the folding operation 1120. In alternative implementations, the contract rollers 1142 can be positioned before the folding operation 1120. When positioned after the folding operation 1120, the contact rollers 1142 can create patterns of visually-distinct contact areas on opposing sides of the bag that are mirror images of each other (as shown and mentioned above in relation to FIGS. 11B and 11C).

The present disclosure may be embodied in other specific forms without departing from its spirit or essential characteristics. Thus, the described implementations are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A multi-film thermoplastic structure comprising:
a first thermoplastic film having a first appearance;
a second thermoplastic film having a second appearance created by a pigment, the first appearance differing from the second appearance;
one or more separated areas where the first thermoplastic film and the second thermoplastic film are unbonded; and
at least one visually-distinct contact area between the first thermoplastic film to the second thermoplastic film, wherein:

the at least one visually-distinct contact area, when viewed from the first thermoplastic film side of the multi-film thermoplastic structure, has the second appearance, the at least one visually-distinct contact area is configured to separate before either of the first thermoplastic film or the second thermoplastic film fails when subjected to peel forces, portions of the first and second thermoplastic films in the at least one visually-distinct contact area are flat and un-deformed, and portions of the first thermoplastic film in the at least one visually-distinct contact area exhibits visual qualities comprising a Delta E between 1 and 10.3 points higher compared to portions of the first thermoplastic film not in the at least one visually-distinct contact area and that are unbonded to the second thermoplastic film.

2. The multi-film thermoplastic structure as recited in claim 1, wherein the at least one visually-distinct contact area comprises a continuous area extending from a first side edge of the multi-film thermoplastic structure to an opposing side edge of the multi-film thermoplastic structure.

3. The multi-film thermoplastic structure as recited in claim 1, wherein the at least one visually-distinct contact area comprises a plurality of visually-distinct contact areas that form a discrete pattern.

4. The multi-film thermoplastic structure as recited in claim 3, wherein the discrete pattern comprises pattern elements oriented in one or more of a machine direction, a transverse direction, or an angled direction.

5. The multi-film thermoplastic structure as recited in claim 1, wherein the portions of the first thermoplastic film in the at least one visually-distinct contact area have physical parameters that are substantially equal to a physical parameters of the first thermoplastic film in the one or more separated areas.

6. The multi-film thermoplastic structure as recited in claim 5, wherein the physical parameters comprise transverse-direction tensile strength.

7. The multi-film thermoplastic structure as recited in claim 1, wherein the one or more separated areas have a third appearance differing from the first appearance and the second appearance.

8. The multi-film thermoplastic structure as recited in claim 7, wherein:
the first appearance is a first color due to a first pigment in the first thermoplastic film;
the second appearance is a second color due to a second pigment in the second thermoplastic film;
the third appearance is a third color; and
the multi-film thermoplastic structure is devoid of a pigment of the third color.

9. A multi-layer thermoplastic bag comprising:
a first thermoplastic bag comprising first and second opposing sidewalls joined together along a first side edge, an opposite second side edge, and a closed bottom edge, the first thermoplastic bag being pigmented with a first color or unpigmented;
a second thermoplastic bag positioned within the first thermoplastic bag, the second thermoplastic bag comprising third and fourth opposing sidewalls joined together along a first side edge, an opposite second side edge, and a closed bottom edge, the second thermoplastic bag being pigmented with a second color;
at least one visually-distinct contact area between the first thermoplastic bag to the second thermoplastic bag, wherein:

the at least one visually-distinct contact area, when viewed from the first thermoplastic layer side of the multilayer thermoplastic bag, has the second color, the at least one visually-distinct contact area is configured to separate before either of the first thermoplastic bag or the second thermoplastic bag fails when subjected to peel forces, portions of the first and second thermoplastic bags in the at least one visually-distinct contact area are flat and un-deformed, and portions of the first thermoplastic bag in the at least one visually-distinct contact area exhibits blocking qualities comprising a peel strength that is between 0.00 g/mm and 0.88 g/mm when peel forces are exerted on a three-inch T peel.

10. The multi-layer thermoplastic bag as recited in claim 9, wherein portions of the first thermoplastic bag in the at least one visually-distinct contact area exhibits visual qualities comprising a Delta E between 1 and 10.3 points higher compared to portions of the first thermoplastic bag not in the at least one visually-distinct contact area and that are unbonded to the second thermoplastic bag.

11. The multi-layer thermoplastic bag as recited in claim 9, wherein portions of the first thermoplastic bag in the at least one visually-distinct contact area exhibits a transverse-direction tensile strength between 54% and 100% of a transverse-direction tensile strength of portions of the first thermoplastic bag not in the at least one visually-distinct contact area and that are unbonded to the second thermoplastic bag.

12. The multi-film thermoplastic structure as recited in claim 1, wherein portions of the first thermoplastic film in the at least one visually-distinct contact area exhibits blocking qualities comprising a peel strength that is between 0.00 g/mm and 0.88 g/mm when peel forces are exerted on a three-inch T peel.

13. The multi-layer thermoplastic bag as recited in claim 9, further comprising heat seals securing the first thermoplastic bag to the second thermoplastic bag, wherein the heat seals in the first thermoplastic bag have the second color and are not configured to separate before either of the first thermoplastic bag or the second thermoplastic bag fails when subjected to peel forces.

14. The multi-layer thermoplastic bag as recited in claim 13, wherein:
the at least one visually-distinct contact area is in a first region of the multi-layer thermoplastic bag; and
thermoplastic films in the first region of the multi-layer thermoplastic bag between visually-distinct contact areas have a uniform gauge.

15. The multi-layer thermoplastic bag as recited in claim 14, further comprising a plurality of deformations in a second region of the multi-layer thermoplastic bag, the plurality of deformations comprising one or more of raised-rib like elements in a strainable network or alternating thicker ribs and thinner stretched webs.

16. The multi-layer thermoplastic bag as recited in claim 14, wherein the first region of the multi-layer thermoplastic bag extends from the closed bottom edge toward a top of the multi-layer thermoplastic bag.

17. The multi-layer thermoplastic bag as recited in claim 16, wherein the at least one visually-distinct contact area comprises a plurality of visually-distinct contact areas arranged in a pattern.

18. The multi-layer thermoplastic bag as recited in claim 9, wherein a gauge of the multi-layer thermoplastic bag in separated regions surrounding the at least one visually-distinct contact area is substantially the same as a gauge of the multi-layer thermoplastic bag in the at least one visually-distinct contact area.

19. The multi-film thermoplastic structure as recited in claim 1, wherein a gauge of the multi-film thermoplastic structure in separated regions surrounding the at least one visually-distinct contact area is substantially the same as a gauge of the multi-film thermoplastic structure in the at least one visually-distinct contact area.

\* \* \* \* \*